(12) United States Patent
Woodbeck et al.

(10) Patent No.: US 11,961,280 B2
(45) Date of Patent: *Apr. 16, 2024

(54) SYSTEM AND METHOD FOR IMAGE PROCESSING FOR TREND ANALYSIS

(71) Applicant: Incogna Incorporated, Oakville (CA)

(72) Inventors: Kris Woodbeck, Gloucester (CA); Huiqiong Chen, Gloucester (CA)

(73) Assignee: Incogna Inc., Burlington (CA)

( * ) Notice: Subject to any disclaimer, the term of this patent is extended or adjusted under 35 U.S.C. 154(b) by 176 days.

This patent is subject to a terminal disclaimer.

(21) Appl. No.: 17/304,608

(22) Filed: Jun. 23, 2021

(65) Prior Publication Data

US 2022/0189140 A1 Jun. 16, 2022

Related U.S. Application Data

(63) Continuation-in-part of application No. 17/093,378, filed on Nov. 9, 2020, now Pat. No. 11,797,601, which is a continuation-in-part of application No. 15/248,190, filed on Aug. 26, 2016, now Pat. No. 10,832,305.

(60) Provisional application No. 62/210,042, filed on Aug. 26, 2015.

(51) Int. Cl.
*G06N 3/08* (2023.01)
*G06V 10/25* (2022.01)
*G06V 10/764* (2022.01)
*G06V 10/82* (2022.01)

(52) U.S. Cl.
CPC ............ *G06V 10/764* (2022.01); *G06V 10/25* (2022.01); *G06V 10/82* (2022.01)

(58) Field of Classification Search
CPC ...... G06Q 20/40; G06Q 20/38; G06V 10/764; G06V 10/25; G06V 10/82; G06V 10/44; G06V 10/422

See application file for complete search history.

(56) References Cited

U.S. PATENT DOCUMENTS

| | | | |
|---|---|---|---|
| 9,008,435 B2 * | 4/2015 | Gokturk | G06Q 30/0603 382/209 |
| 9,317,778 B2 * | 4/2016 | Cordova-Diba | G06F 16/73 |
| 9,576,218 B2 * | 2/2017 | Huang | G06V 10/462 |
| 10,776,854 B2 * | 9/2020 | Noguchi | G06Q 30/06 |

(Continued)

*Primary Examiner* — Florian M Zeender
*Assistant Examiner* — Milena Racic
(74) *Attorney, Agent, or Firm* — Garvey, Smith & Nehrbass, Patent Attorneys, L.L.C.; Seth M. Nehrbass; Fabian M. Nehrbass

(57) ABSTRACT

Systems and methods for analyzing trends in image data is disclosed. A trend query is received relating to an object category and defining two or more groups of interest for which trend data is to be determined with a defined time period. Visual tokens of interest are identified relating to the object category for use in searching a token database. One or more image data sets are identified that are associated with each of the two or more groups of interest. Visual tokens are analyzed matching the visual tokens of interest that are associated with the identified image data sets to generate trend data for each of the two or more groups of interest for the defined period of time. An output is generated based on a comparison of the trend data generated for the two or more groups of interest for the defined period of time.

19 Claims, 25 Drawing Sheets

(56) References Cited

U.S. PATENT DOCUMENTS

2007/0217676 A1* 9/2007 Grauman ............. G06V 10/764
382/190

* cited by examiner

SYSTEM AND METHOD FOR IMAGE PROCESSING FOR TREND ANALYSIS

CROSS REFERENCE TO RELATED APPLICATIONS

This application is a continuation-in-part of U.S. patent application Ser. No. 17,093,378, filed on Nov. 9, 2020, which is a continuation-in-part of U.S. patent application Ser. No. 15/248,190, filed on Aug. 26, 2016, which is granted as U.S. Pat. No. 10,832,305 B1, issued on Nov. 10, 2020, which claims priority from U.S. Provisional Application No. 62/210,042 filed Aug. 26, 2015, the entire contents of each of which are hereby incorporated by reference for all purposes.

TECHNICAL FIELD

The disclosure relates generally to image processing, and more particularly to classifying images for use in analyzing trends.

BACKGROUND

Current image search technologies are typically based on either metadata such as keywords or overall image features such as RGB or brightness histograms. The search results provided are only as good as the keyword provided and the accuracy of the keywords present in the database. Although humans can easily determine similarities between images and can categorize images, computer systems to date have not provided efficient searching means to deal with large image collections. This short coming leads to problems and inefficiencies particularly for online retailers and the e-commerce industry, and also inhibits being able to analyze image data to glean meaningful information.

E-commerce is a trillion dollar a year industry and growing. In e-commerce, a customer searches the Internet to find a product to purchase from an online retailer, for example. When a product is found, the customer may purchase the product with a credit card and arrange to have it shipped to their home or workplace.

A known problem in the retail industry is when inventory is out of stock, resulting in a lost transaction. Retailers have great difficulty in trying to match inventory with customer demand. The amount of inventory to buy and stock is often based on best guesses and historical data to try to predict upcoming demand. If a retailer orders too much inventory that does not sell, particularly inventory which may go out of style, the retailer's profits will be adversely affected. Likewise, if the retailer orders too little inventory to meet customer demand, this leads to lost sales opportunities and dissatisfied customers as a result of the out of stock items, which also negatively affects the retailer. When dealing with out of stock (OOS) items, small retailers specialize in suggesting related and replacement items from their existing inventory. For example, a customer who comes in looking for a pink dress shirt may be directed to a similar shirt when the one they seek is unavailable. A tie may also be selected and offered to the customer, to try to upsell the customer. This may help to result in fewer lost sales opportunities due to out of stock merchandise and significant upsell results.

In the e-commerce industry, upselling is usually driven by products that other people have purchased in conjunction with a product of interest. Though historically driven product suggestions are useful in driving sales, they are less effective than, for example, a salesperson's suggestion of upsell items. In some categories of online sales, unavailable products also remain a significant problem. Of course in those categories, product suggestions are even more problematic. When suggested products for out of stock items or upselling are determined based on images, the current image search technology provides very poor search results with many of the displayed images representing unrelated content, and the limited processing speed relegates relevance based image search engines to desktop applications where collections are limited in size. Further, it would be desirable to mitigate the number of occurrences of OOS items to reduce the number of lost sales opportunities and improve customer satisfaction, without carrying too much inventory that won't end up selling. It would be particularly advantageous to identify consumer trends, for example based on social media images, to help retailers make decisions about products.

Accordingly, an improved system and methods that enable classification of images in an efficient and accurate manner, particularly for identifying and analyzing consumer trends, remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
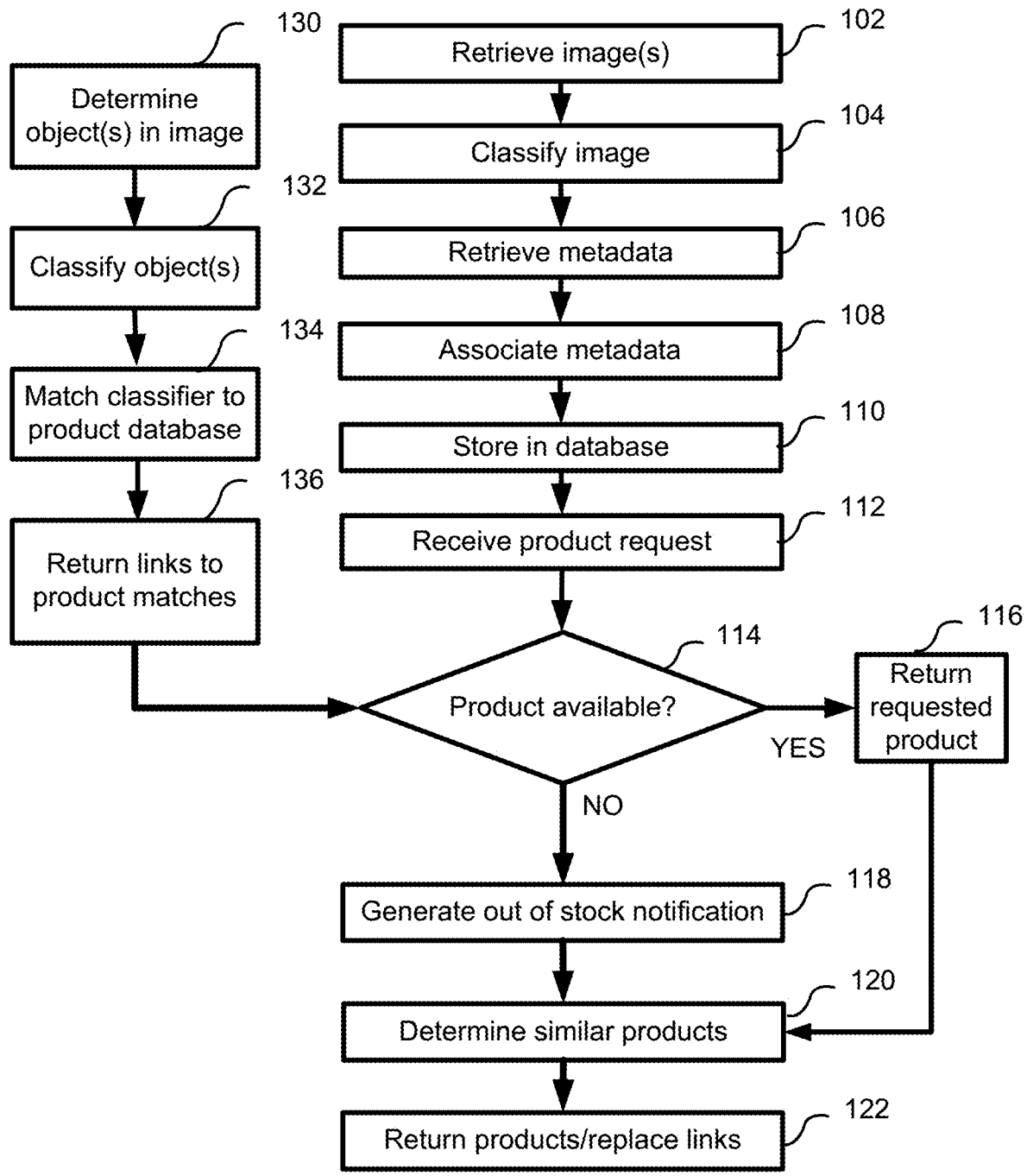
FIG. 1 is an overall method for using image classification and searching for returning e-commerce product requests.

One embodiment of the present disclosure provides a method for analyzing trends using image data, comprising: receiving a trend query relating to an object category and defining two or more groups of interest for which trend data is to be determined with a defined time period; identifying visual tokens of interest relating to the object category for use in searching a token database storing a plurality of visual tokens, wherein each visual token stored in the token database is stored in association with an identifier that identifies the visual token as being associated with an image data set; identifying one or more image data sets associated with each of the two or more groups of interest; analyzing visual tokens matching the visual tokens of interest that are associated with the identified image data sets to generate trend data for each of the two or more groups of interest for the defined period of time; and generating an output based on a comparison of the trend data generated for the two or more groups of interest for the defined period of time.

In some aspects, the trend query comprises the visual tokens of interest, or at least one of an image and one or more search terms from which the visual tokens of interest can be derived.

The method may further comprise retrieving images from the one or more image data sets within the defined time period, and generating one or more visual tokens for each of the images.

In some aspects, the trend data generated by analyzing the visual tokens is indicative of a presence of an object attribute in relation to the object category over time.

In some aspects, the trend query further defines the object attribute for which trend data is to be determined, and wherein the visual tokens of interest relate to the object attribute.

In some aspects, each of the two or more groups of interest comprise one of: an influencer, a group of influencers, a retailer, a group of retailers, a brand, and a group of brands.

The method may further comprise populating the token database with the plurality of visual tokens, wherein the plurality of visual tokens are generated from a plurality of images, and for a respective image a visual token is generated by: detecting an object in the image by performing foreground detection on the image; classifying the object in accordance with an object category; determining one or more attributes of the object; and generating the visual token associated with the image, the visual token comprising information including the object category and the one or more attributes of the object.

In some aspects, the plurality of images are retrieved from one or more of: the Internet, social media sites, television content, and product databases.

In some aspects, classifying the object comprises: computing, with a simple cells layer, convolution operations using filters selected from a group consisting of: 2D Gabor, or Gabor-like filters, over a range of parameters; performing, with a complex cells layer, a pooling operation over a retinotopically local cluster of simple cells within a complex receptive field; sending an output of the pooling operation to one of a group consisting of: the simple cells layer, another complex cells layer, or a feature descriptor layer; terminating computations in the simple cells layer and complex cells layer as per a Cellular Neural Network definition, wherein the output is a set of values representing a set of feature descriptors; assessing, with a complex localization cells layer, regions in which the object of the product image is located; and classifying the object using the complex localization cells layer, regions and feature descriptors.

In some aspects, the token database further stores a plurality of textual tokens, wherein each textual token stored in the token database is stored in association with an identifier that identifies the textual token as being associated with an image data set.

The method may further comprise populating the database with the plurality of textual tokens, wherein the plurality of textual tokens are generated from a plurality of images, and for a respective image a textual token is generated by: determining image metadata for the image; and generating the textual token associated with the image, the textual token comprising the image metadata.

In some aspects, the image metadata comprises one or more of: a timestamp of the image, descriptive details associated with the image, a popularity of the image, and a location of the image, and wherein the descriptive details comprise one or more of: a social network, a user name, a caption, a URL associated with the image, pixel co-ordinates associated with products or brands present in the image, and details about a subject in the image.

In some aspects, the trend query defines grouping parameters specifying the two or more groups of interest, and wherein identifying the one or more image data sets associated with each of the two or more groups of interest is performed by analyzing the image metadata of the textual tokens based on the grouping parameters.

The method may further comprise identifying textual tokens of interest relating to the object category in the trend query, and wherein generating the trend data for each of the two or more groups of interest is further based on an analysis of textual tokens matching the textual tokens of interest that are associated with each of the identified image data sets.

The method may further comprise displaying the output on a display.

The method may further comprise generating an activation for the trend, the activation comprising one or more scheduled activities relating to the trend data.

Another embodiment of the present disclosure provides a system for analyzing trends using image data, comprising: a token database storing a plurality of visual tokens, wherein each visual token stored in the token database is stored in association with an identifier that identifies the visual token as being associated with an image data set; and a server comprising at least one processor configured to: receive a trend query relating to an object category and defining two or more groups of interest for which trend data is to be determined with a defined time period; identify visual tokens of interest relating to the object category for use in searching the token database; identify one or more image data sets associated with each of the two or more groups of interest; analyze visual tokens matching the visual tokens of interest that are associated with the identified image data sets to generate trend data for each of the two or more groups of interest for the defined period of time; and generate an output based on a comparison of the trend data generated for the two or more groups of interest for the defined period of time.

In some aspects, the trend data generated by analyzing the visual tokens is indicative of a presence of an object attribute in relation to the object category over time.

In some aspects, the at least one processor is configured to display the output on a display.

In some aspects, the at least one processor is configured to generate an activation for the trend, the activation comprising one or more scheduled activities relating to the trend data.

Other aspects and features will become apparent to those ordinarily skilled in the art upon review of the following description of specific embodiments of the disclosure in conjunction with the accompanying figures.

The following description is presented to enable a person skilled in the art to make and use the described subject matter, and is provided in the context of a particular application and its requirements. Various modifications to the disclosed embodiments will be readily apparent to those skilled in the art, and the general principles defined herein may be applied to other embodiments and applications without departing from the scope of the disclosure. Thus, the present disclosure is not intended to be limited to the embodiments provided, but is to be accorded the widest scope consistent with the principles and features disclosed herein.

A stock keeping Unit (SKU) identifier is an intended unique identifier of a product. A product description page (PDP) describes a product associated with a SKU and allows for the purchase of one or more products, or for addition of the one or more products to a shopping cart tied to the customer's session. Most PDPs are associated with at least one SKU relating to the one or more products allowing the SKU to be used to search within a database of PDPs.

Affiliate marketing is a process of marketing by an affiliate products that are sold through online retailers other than the affiliate. In many affiliate marketing instances, the affiliate is paid a commission for referring a customer to an online retailer. The affiliate facilitates the on-line transaction through their website but does not maintain the inventory provided by the retailer. Affiliate websites maintain a product database and provide shoppers with an alternate method to discover and review products, and an interface through which those products can be purchased. They typically redirect a customer to a location where the purchase transaction can be completed directly with the online retailers. An example of affiliate marketing are photo sharing websites where users can upload photos which can subsequently be linked to retailer sites to facilitate transactions. The products may not necessarily be exact matches to the product in the photos but rather be similar products in appearance which may be offered by multiple retailers.

Referring to FIG. 1, an overall method 100 for using image classification and searching for returning e-commerce product requests is shown, which may be implemented by either direct online retailers or by affiliate sites such as for example on-line photo sharing websites where consumers can post images which can be indexed and mapped to retail products. The first part of the method relates to populating a hierarchical database for product images, which may then in turn be used for handling e-commerce product requests in the second part of the method. The method 100 begins by retrieving an image(s) of product from a database (102). The images are then classified (104) using image recognition techniques which will be described in more detail in connection with the subsequent figures. Metadata for the product is retrieved (106) and associated with the respective image (108). A product identifier for the images with associated metadata is generated and may be stored in a hierarchical database (110).

When an online shopper selects a product to purchase, the product request is received (112) and it is determined if that product is available in stock (114). If the product is available (Yes at 114), the requested product is returned (116). If the product is not available (No at 114), an out of stock notification is generated (118), which may or may not be presented to the user depending on the website configuration but may be used to determine how alternatives for product selection are utilized when determining similar product matches. Similar products may then be determined (120) using the product identifier based on the image classification and associated metadata previously stored in the database (110). Alternatively the object classifiers may be used to determine product identifiers if the object in an image has not been previously associated with a product identifier. Even if the requested product is available (Yes at 114), similar products may still be determined (120) to show the customer what alternative products may be available as well, or for upsell purposes. Lastly, the products are returned and displayed to the customer (122) or links associated with the image may be replaced to redirect to available products in for example a photo sharing website. The method may also include classification of images to determine objects within the images and matches to the product database, for example in a photo sharing website. Uploaded images can be analyzed to determine objects present in the image (130) which may be matched to retailers and links associated with the objects. The links provide HTML identifiers to be associated with an object in an image and direct a user to a retailer or re-direct page when the object is selected. Each object is then classified (132) and matched to the product database (134). The images may be matched to one or more products depending on the application, inventory, price, retailer, or ranked next to products having the most similarity. HTML links can then be generated to the retailer for each identified product and matched to the image to allow subsequent selection of a user (136). In the event that a product is out of stock the links associated with the image can be replaced with similar products links as required. Alternatively, existing links to products may be dynamically replaced based upon the stock indicator values based upon object matches. In addition the product classification can be utilized to enable out of stock matching to similar products within a retailer inventor or across retailers.

Figure 2:
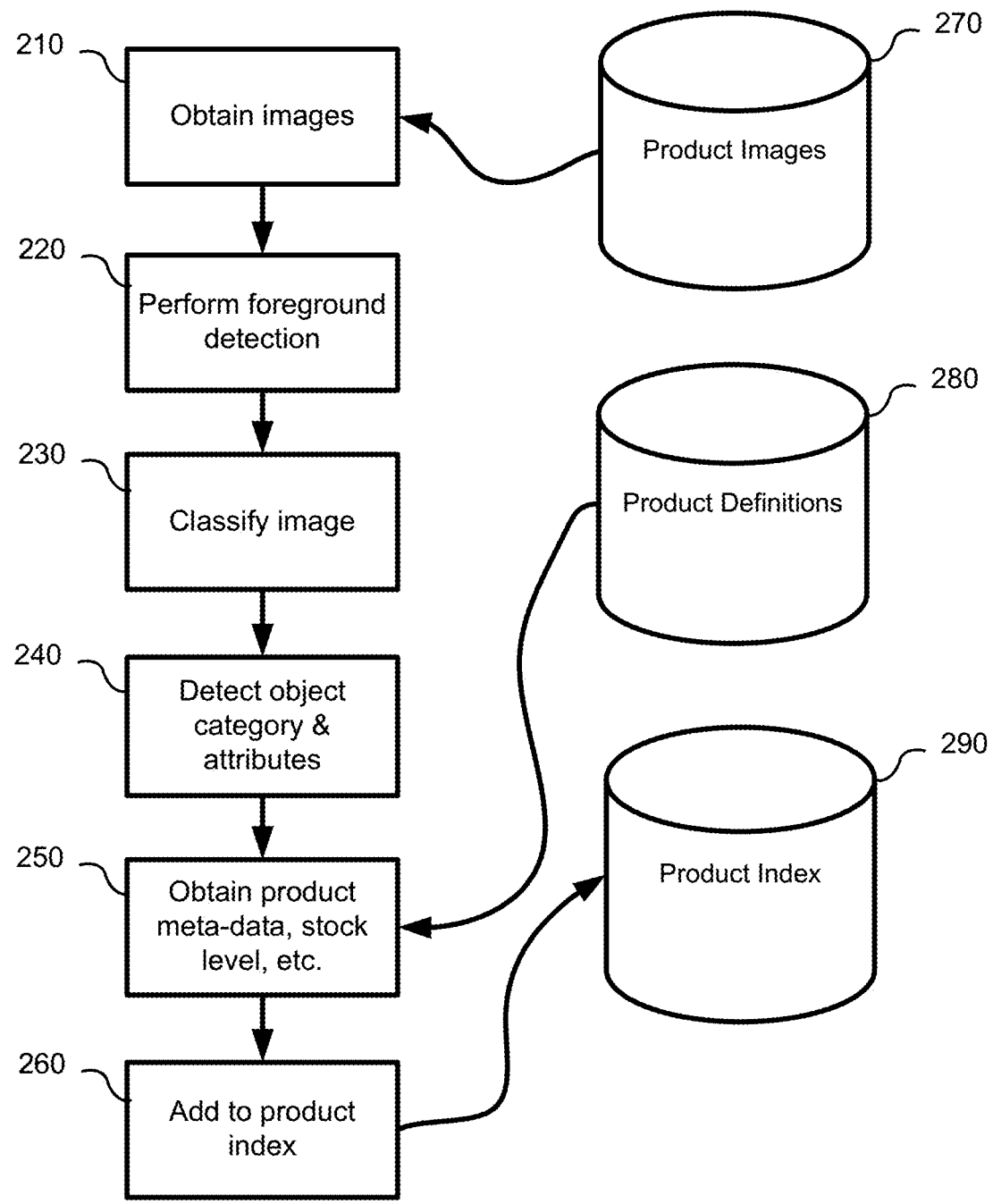
FIG. 2 is a simplified flow diagram of a method of creating a product index.

Referring to FIG. 2, a simplified flow diagram 200 is shown for a method of image correlation in a data set of images by creating a product index—this is the first part of method 100 previously described. One or more images are provided (210). For example, the images are retrieved from a Product Image database 270 that may contain product images that a direct retailer offers, or may contain product images from various retailers that an affiliate site represents, or be provided by users in a photo sharing website and may contain one or more products that can be mapped to different vendors and potential retailers. For each image, foreground detection is performed to identify objects or portions of each image that are in the foreground (220). Once foreground portions are identified, the images are classified (230). The image classification is used to determine object category type and attributes (240). This allows for retrieval of product metadata and stock level data (250). For example, this information may be retrieved from a Product Definitions database 280. An identifier for the product image and associated metadata is then added to the Product Index database 290 (260). Thus, for each product image an index entry is created, which provides an image database for use in searching of products based on their images or similar images. The image may also be divided into multiple classifications if multiple products are present. Alternatively the image may be sub-divided to identify unique individual products within the picture.

For each image a data entry is formed for use in correlating the images and for correlating the images with newly provided images. The data entry in the Product Index database 290 forms a classification of the image. In its simplest sense, the data entry may be a class such as shoes, a subclass such as loafers, and so forth along with other extracted data on classification all associated with the image and with a SKU. Accordingly, the Product Index is a hierarchical database. As the classification is numerical in nature, it need not correlate to human intelligible classifications. When another identical image is provided to the system, it classifies the image the same way and therefore pulls up the same entry within the database.

In contrast to a typical keyword or metadata based image search engine, computer vision systems have become quite adept at recognizing objects that they have already seen, but the more general task of recognizing a class from a limited number of instances has proven somewhat elusive. Since the primate visual system outperforms all existing computer vision systems, it is reasonable to look towards biology for inspiration in this problem. Biologically inspired work has produced a number of models that compete with the top computer vision systems. These models aim to replicate the lowest levels of the visual cortex and generally place a great deal of focus on visual features. Much less focus has been given to the problem of developing a biologically plausible classifier. Existing models have been implemented on Single Instruction Single Data (SISD) processors, but given the highly parallel nature of the human brain, a more parallel processor is clearly required to achieve the high performance of the visual cortex. The adoption of highly parallel programmable Single Instruction Multiple Data (SIMD) processor programming architectures in applications such as Graphics Processing Unit (GPU) has provided an inexpensive architecture for emulating the highly parallel nature of the human brain.

The cells in the lowest level of the visual cortex can be thought of as performing a number of operations that are fundamentally Single Instruction Multi Data (SIMD) in nature. The lowest areas of the visual cortex are retinotopic, meaning that local regions of cells all perform identical operations on different regions in the visual field. This means that adjacent cells process adjacent regions of the visual field, which is the very definition of an SIMD process. At the lowest areas the operation is a convolution operation which continues onto various forms of pooling mechanisms to construct higher order visual features.

A crucial aspect of object recognition, which is important for image classification and searching, is that many object classes cannot be recognized using only small, isolated regions of the image. The importance of pooling simple features in more complex features is clear. It is therefore important to find an effective method of grouping local feature descriptors that belong to the same object together; ideally each descriptor should be aligned with the intrinsic geometry of the object in question. By grouping descriptors and determining multiple classifiers for each image a hierarchical database (e.g. the Product Index 290) can be created that enables fast and efficient image classification and search results.

Figure 3:
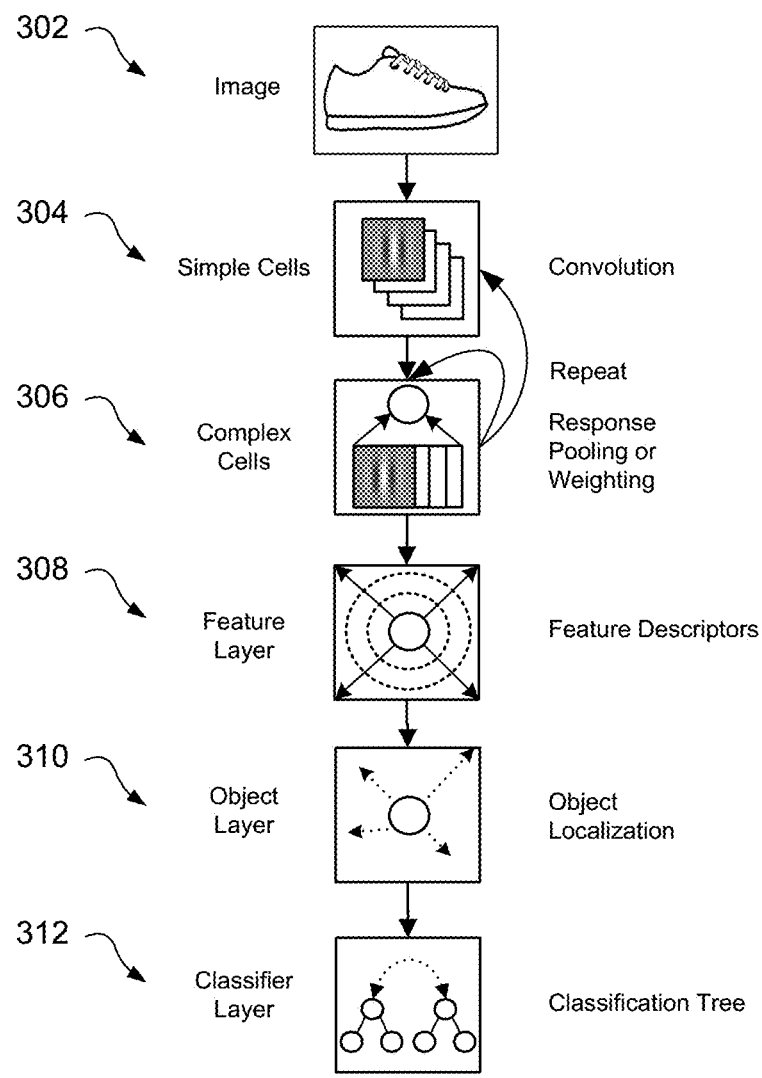
FIG. 3 shows a schematic representation of image classification and localization model.

Due to the inherent incompatibility between most SISD and SIMD algorithms, many existing models cannot be used to enable a biological based image search system. The image classification starts with V1 simple and complex cells, as shown in FIG. 3, which provides a schematic representation of an image classification and localization model 300. Simple cells perform convolution operations with Gabor or Gabor-like filters on a received image. Complex cells perform higher order tasks, including pooling simple cell responses at a given orientation. Simple and complex cells are alternated with arbitrary level of complexity; their receptive fields gradually grow in size and the final configuration is known as a Cellular Neural Network.

By formalizing the role of hypercomplex cells within V1 and V2 a more effective model can be constructed. This feature descriptor is built around several key anatomical structures. The first of which is simple and complex cells, which are applied in an alternating fashion that is equivalent to the cells used in other models. FIG. 3 shows the data flow within the system starting with the input pixels of an image, all the way to a usable detection and classification of an object in an image. The process begins with a series of convolution-like image processing operations, which mimic the Simple Cells located in the visual cortex, whose output is used to generate higher order invariant structures which culminate in feature descriptors related to specific object classes, which are then used to detect and classify specific object types.

FIG. 3 shows illustratively the layers of an image classification and search model. An image 302 is acquired by the system representing a product such as a clothing item. The image may be presented in any number of image formats such as .JPG, .GIF, .RAW or may be a selected from a multimedia file such as .MPG, .AVI, .MOV, etc. Any computer definable image format may be utilized for processing by the system.

Simple Cells Layer (304)

The V1S layer 304 is computed either directly from the image 302 or from the retinotopic output from a previous pooling step (306) with a convolution using 2D Gabor or Gabor-like filters over a range of parameters. An example of a possible Gabor filter is described:

$$C_S(\theta, x, y) = \exp\left(-\frac{x_1^2 + \gamma^2 y_1^2}{2\sigma^2}\right)\cos\left(2\pi\frac{x_1}{\lambda} + \psi\right)$$

$$x_1 = x\cos(\theta) + y\sin(\theta)$$

$$y_1 = y\cos(\theta) - y\sin(\theta)$$

Where

σ and λ are related by a bandwidth parameter, b.

Sample parameters used in the system range from the values shown in Table 1.

TABLE 1

| Parameter | scale | θ | ψ | b | γ | λ |
|---|---|---|---|---|---|---|
| Value Range | [5, 31] | [0, 2π] | $[-\frac{\pi}{2}, \frac{\pi}{2}]$ | [0.2, 3.0] | [0.0, 3.0] | [0.0, 6.0] |

After the convolutions are completed, complex cells perform a pooling operation over a retinotopically local cluster of simple cells within the complex cell receptive field, $\sigma_{RF}$. The pooling is modeled with a MAX operation.

Complex Cells Layer (306)

The Simple Cell Layer 304 performs its operation on local areas within the visual receptive field, but since an object can take up any (and arbitrary) amounts of the visual field, it's important that the system is able to take into account a broader set of input at later stages of the data flow. The visual cortex has been observed to have a gradual broadening of perspective as the input transfers to cells in the later stages. There are many types of Complex Cells possible, one of which is done using a MAX operator. The MAX operator simply selects the most active input from its retinotopic receptive field. The receptive field for any MAX pooling Complex Cell is configurable, so it can be adjusted as necessary depending on the depth and configuration of the overall Cellular Neural Network.

The output from the Complex Cell Layer 306 can then be sent onto either 1) another Simple Cell Layer, 2) another Complex Cell Layer, or 3) the Feature Descriptor Layer 308. The fact that the output from Complex Cells can be chained to one another and passed back to Simple Cells makes this a type of recursive data processing method. The functional logic behind the decisions of what parameters to be used at each step in the recursive process, as well as when to halt, are defined a priori. This parameter set is known as the Cellular Neural Network Definition. Any number of potential configurations is possible in a Cellular Neural Network Definition, reaching any depth from two layers, up to hundreds or more layers.

It is of note that a variety of operations can be included as Complex Cells, such as weighted all-to-one connections, and other pooling type operations that are typically seen in classic neural nets. Another type of Complex Cell is a MAX classification cell, i.e. a cell that maintains a set input connections that are weighted, and then it simply assigns a label to the input with the highest weighted activation, thus assigning a classification output for the given input. Common neural net training methodologies, such as back-propagation, can also take place within the Complex Cell structure.

Feature Descriptor Layer (308)

Once the Simple/Complex Cell computation process has terminated, as per the network's Cellular Neural Network Definition, the resulting output is a set of values that represent a set of retinotopically local areas within the input image. These types of structures are known as Feature Descriptors, and are able to be used at higher levels for a variety of useful tasks, such as locating an object or classifying the object and/or its sub-attributes. Later classification or localization tasks can also make use of other Feature Descriptors from separate Cellular Neural Network Definitions. This layer simply formalizes that there is a structure output of pre-determined size, as per the network's Cellular Neural Network Definition.

Object Layer (310)

The Feature Descriptor Layer 308 is able to represent a variety of important aspects of an image, but before this can be put to use, it is essential to know what part of the image represents the bounds of an object of interest, i.e. where the object's contour starts and ends. The features from all levels of computation in the Cellular Neural Network Definition can be used to propose potential areas of interest in which an object could potentially be located. This type of operation can be thought of as a higher order type of Complex Cell Layer, i.e. a Complex Localization Cell Layers, that given an input image, both proposes and assesses regions in which the object is located. It is optimal when the proposed regions make use of the lower level Simple and Complex Cell Layer outputs, although other methods may be used.

Classifier Tree Layer (312)

The result of certain Cellular Neural Network Definitions results in a classifier being created; where Feature Descriptors can be used directly for classification tasks, for example to tell if an object region belongs to a shoe vs a bag. Any arbitrary classification is possible, composing any level of attributes about a given object. For example, a particular shoe may have high heel or low heel, and a Cellular Neural Network Definition can be made that emphasizes the heel portion of any localized shoe object once the classifier has determined that the region is, for example, a shoe and not a bag. These domain specific classifiers are chained in a tree-like fashion, such that certain sub-classifiers are run on the relevant image regions once higher level classifier determines that it is a relevant selection. Generally, each sub-tree belongs to a common category and the training data is shared and split in relevant ways across the sub-classifiers. For example, shoes may have a variety of important classifiable attributes, such as heel type, lace type, material, function, and other things that separate shoes at a practical, visual level. Each classifier attribute within a sub-tree can be trained separately using a distinct Cellular Neural Network Definition in order to allow the network to fine-tune the attribute properties to the objects in question. This classification tree structure can be extended to any size.

One embodiment of the image classification and localization model 300 is that images for each product angle may be processed separately. In the non-limiting shoe example, a top view may classify feature descriptors based on laces, toe shape, etc., while a side view may classify feature descriptors based on the heel, arch, etc. These may be linked together by a single SKU to reduce the results.

Figure 4:
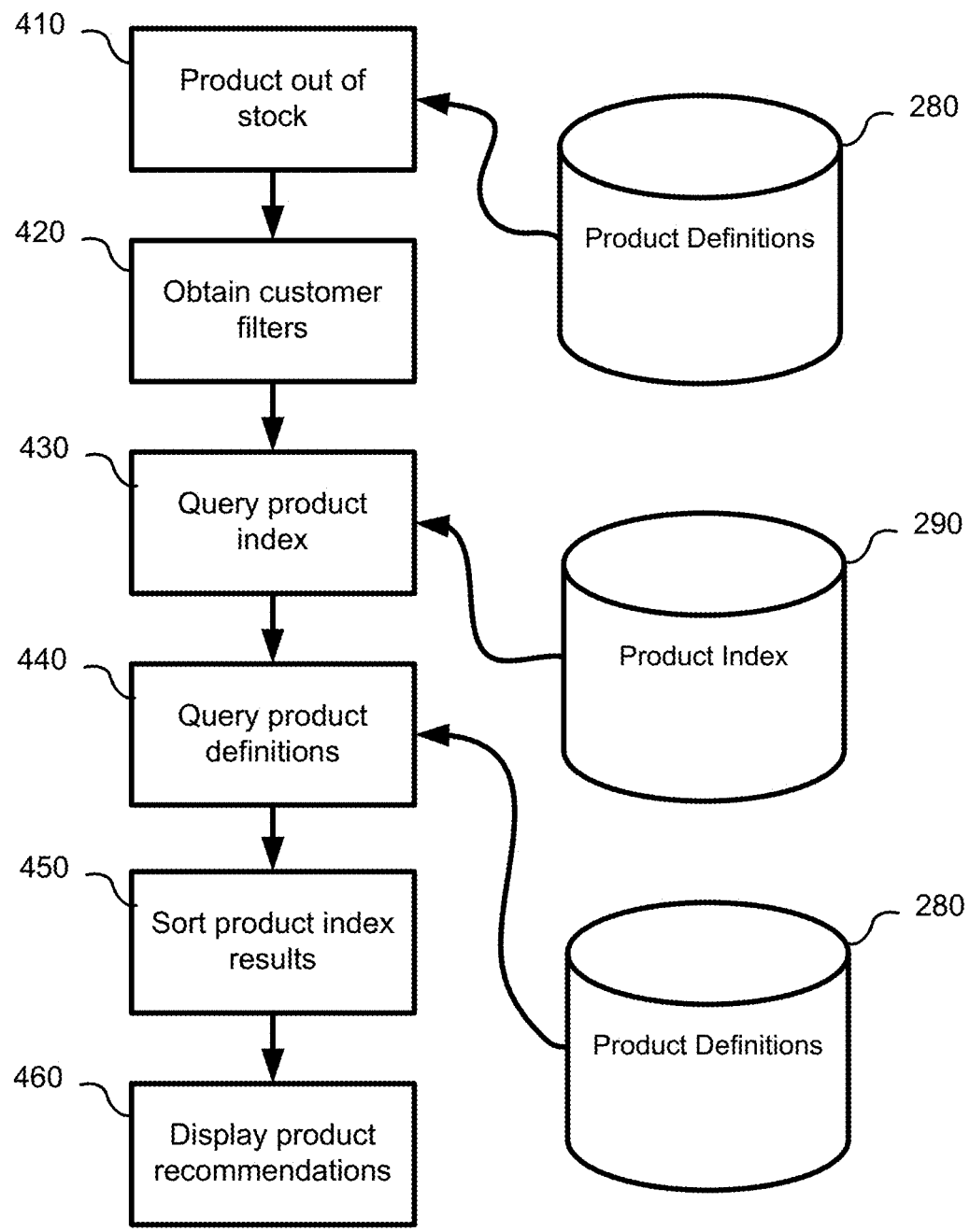
FIG. 4 is a simplified flow diagram of a method for responding to out of stock events.

Using image searching and classification, FIG. 4 shows a simplified flow diagram 400 for addressing out of stock product recommendations—this is the second part of the method 100 previously described. A product is detected as out of stock (410) relying, for example, on the Product Definitions database 280. The product definitions include unique product identifiers such as a Stock Keeping Unit (SKU) identifier, quantity of the product, origin of the product, price of the product, economic classification of the product, use of the product, construction material of the product, user ratings for the product, etc. Thus stock levels at the direct retailer, or at any of a number of retailers carrying the same product (in the case of affiliate sites) are assessable. Some products may only be available from a single retailer. Other products may be widely available. Products may have multiple SKUs for a product sometimes viewed as the same by customers, for example different sizes of a shoe or different colors of a product.

Detecting that a product is out of stock happens in any of a number of ways. For example, the online retailer may be queried and returns out of stock details. Alternatively, stock information for products may be maintained locally based on data collected from retailers. Further alternatively, retailers may push out of stock data into the data set as products sell out.

Next, customer filters are obtained (420). In some embodiments these filters are obtained directly from the customer. For example, size 10 for a shoe would allow filtering of results based on availability of size 10. Another filter of merit is price, for example under $200. Of course any number of filters is supported depending on the implementation and application. In another embodiment the user filters are based on user preferences. This might limit where a product comes from, the type or reputation of the seller, the price of the product, the size, the shipping time, etc. In some embodiments the user enters these preferences and in others the system learns them over time based on user behavior. In some embodiments, it is a combination of one or more of the user entering filter options, the user entering preferences and the system learning user preferences.

The Product Index database 290 is queried (430) using the identifier for the out of stock product to identify similar products that meet the user filter criteria. In some embodiments, there is no user filter data and the results of the query are based solely on similarity as classified within the Product Index database 290. Based on the results from the Product Index database 290, the Product Definitions database 280 may again be queried (440) to ensure that the products recommended by the Product Index database 290 are in stock. If not in stock, then those similar products would not be returned. Only the products determined to be in stock are then left within a resulting list of substitute products. Finally, the Product Index results are adjusted/sorted (450), and the recommendations are displayed (460). For example, they are sorted and limited to a displayable quantity. Sometimes sorting and limiting is not merely an issue of best to worst and then displaying the first five, but instead involves forming a suitable mix of displayed results. In some embodiments, the results show the best match, the cheapest match, and two or three matches selected for likelihood of being correct. For example, a Gucci® bag image is provided and the best match is a $99 bag from one retailer, the cheapest match is a $29 bag from another retailer and the other displayed options are similar designer bags costing $1,000 and a Gucci® bag costing $2,000, respectively. Thus the user can select between very similar choices in appearance, and similar choices in branding, quality and cost.

As previously described in method 100, similar products could also be determined and recommended even if the requested product is in stock. In this case, the method 400 may begin with the step 420, and the Product Index database 290 would be queried with the product identifier of the requested product.

In a further embodiment, a customer may request a product or similar products by providing an image to the retailer or affiliate site. For example, perhaps a customer is at a physical retail store and sees a shoe that they like, but it is not in their size. They could take a picture of the shoe with a camera on their mobile phone, and then query their favourite retailer or affiliate to see if they carry that size of shoe or similar shoes. In this case, the customer filters may be obtained (420) by classifying the image in accordance (220, 230, and 240) and the image classification and localization model 300. Accordingly, once the customer filters are obtained the Product Index database 290 could be queried to search for the product or similar products based on how the image sent by the customer was classified (430-460) as shown in FIG. 4. This example is non-limiting, and may be extrapolated to any variety of products. Instead of taking a photo of a product at a retail store, perhaps it could be a picture of a friend's shoe, or an image found online. In another example, the customer filters may be obtained both by classifying the product image and by obtaining filters directly from the customer.

Again, the above methods may be implemented by direct online retailers or affiliate sites. In some cases the affiliate site may have their own databases for Product Images, Definitions, and/or Index for the products that they offer. These databases may be separate for each affiliated vendor, such that if a product is requested and is determined to be out of stock, only similar products by that vendor will be searched for. Alternatively, if a product is requested and is determined to be out of stock, similar products may be searched for from any or all affiliated vendors. Still alternatively, the affiliate site may store all product information from all vendors in the same databases, or may group product data from certain vendors into the same databases. In another embodiment, the affiliate site does not store any of this information and immediately outsources the product request to the retailer. In such a case, the methods above would be performed by the retailer.

Figure 5:
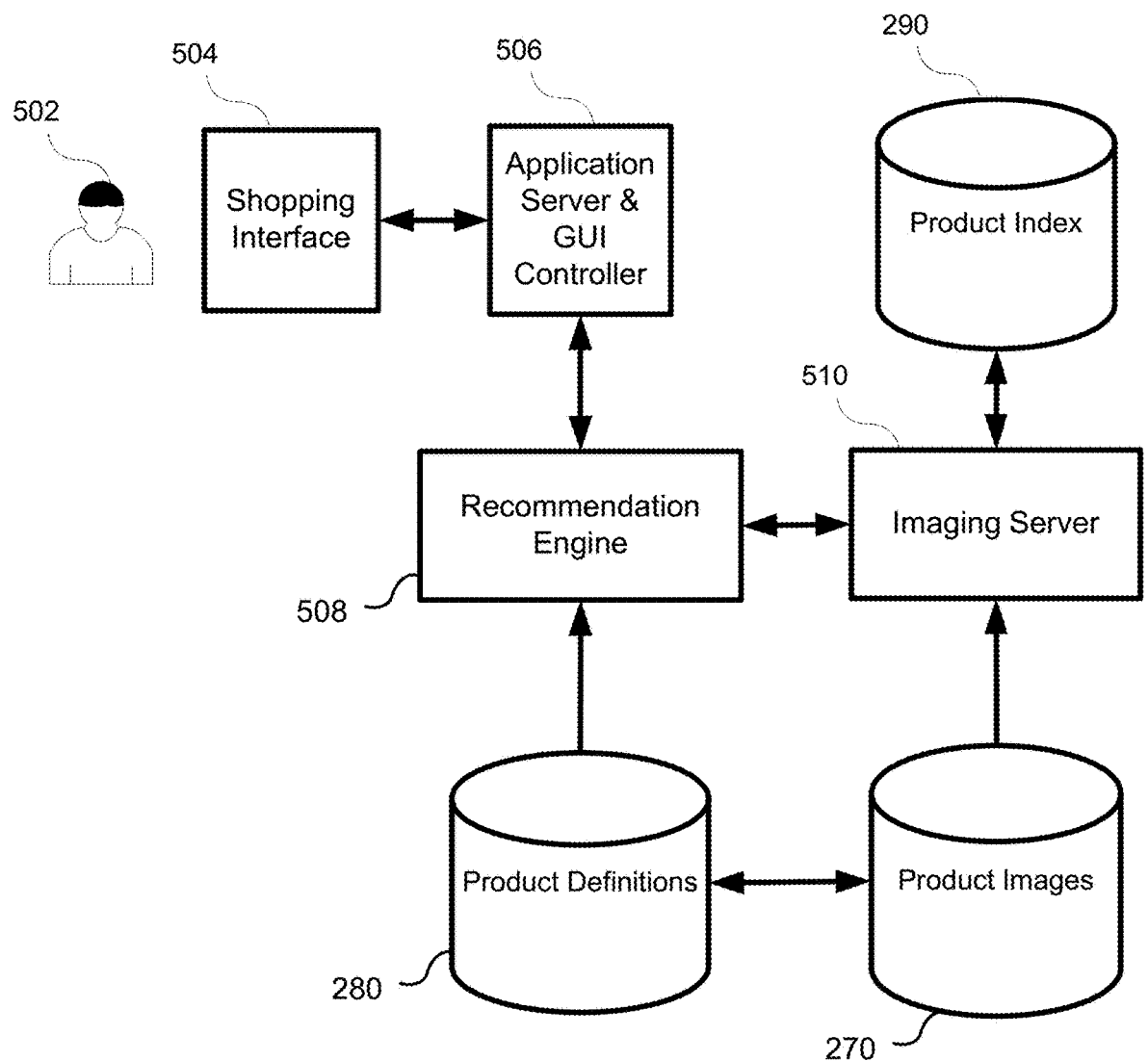
FIG. 5 is a simplified system diagram of a system for product searching and recommendation.

Referring to FIG. 5, shown is a simplified diagram of a system according to an embodiment of the disclosure. A shopping interface 504 is provided to a user 502. A user system supporting the shopping interface 504 thereon communicates with an application server 506 via a wide area network in the form of the Internet. The application server 506 communicates with a recommendation engine 508 to receive therefrom recommendations in response to user related shopping interactions. The recommendation engine 508 communicates with an imaging server 510 that retrieves information from the Product Index database 290 and the Product Images database 270. Product images are used to determine images that correlate and the product index is relied upon to provide product information relating to each product. The recommendation engine 508 also retrieves product definition data from the Product Definitions database 280 to define and describe products being recommended. In an embodiment of the methods described above, one example may be that when a product is requested by a customer, the request is sent to the recommendation engine 508. This determines if the product is in stock or not by pulling the product information from the Product Definitions database 280. If the requested product is out of stock (or it is in stock but it is desired to provide alternatives anyways), the recommendation engine 508 sends the product identifier and other customer filters to the imaging server 510, which can determine similar products from the Product Index 290 based on the image classification of product images previously performed. The product images of the suggested products (from the Product Images database 270) and the product metadata of the suggested products (from the Product Definitions database 280) may then be returned to the customer.

Figure 6:
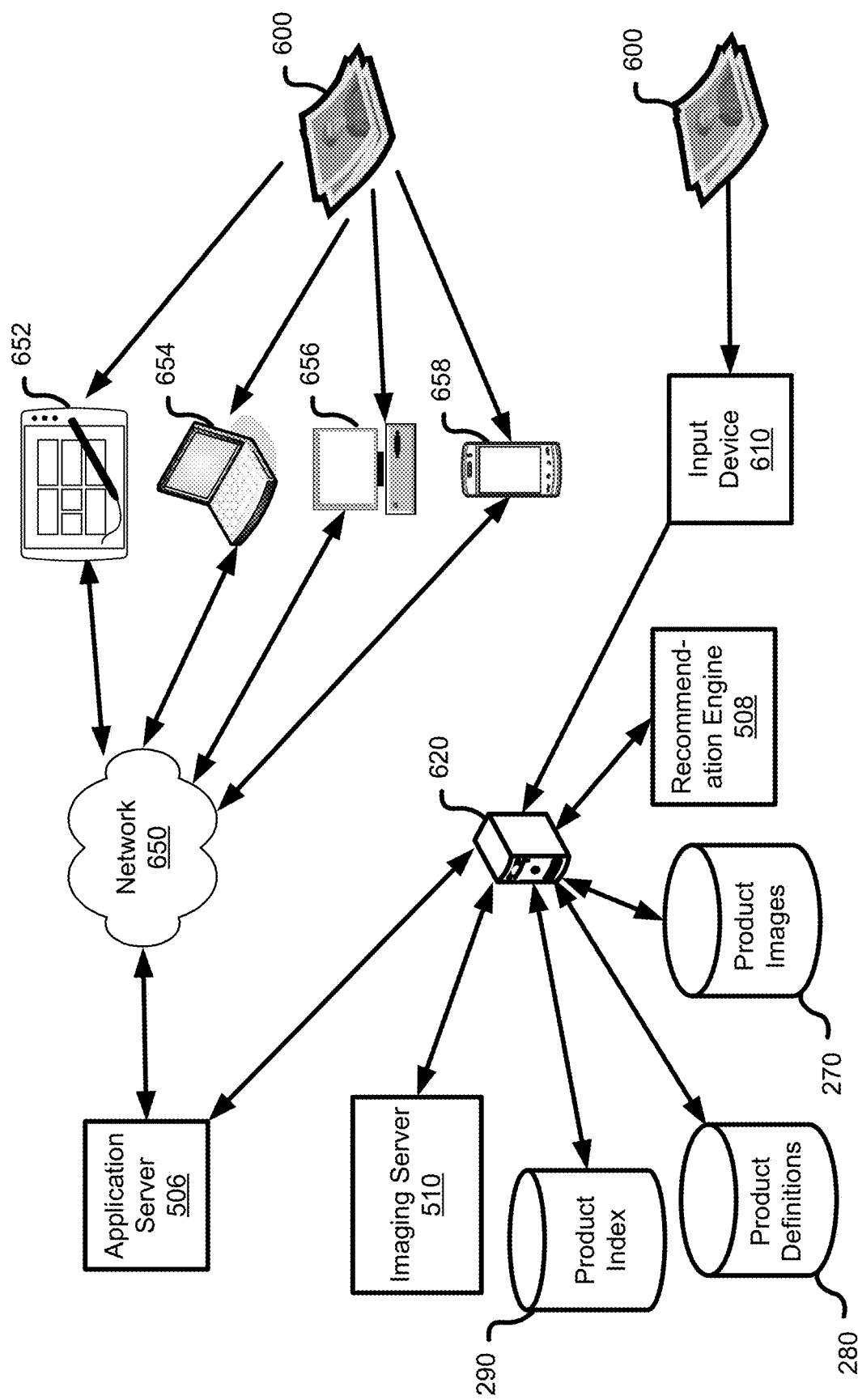
FIG. 6 shows an overview of a system for image searching.

FIG. 6 shows an overview of a system for image searching. Product images 600 can be stored or acquired from a number of locations or devices. In one embodiment, the product images 600 may be uploaded to a server/host 620 through an input device 610 such as a scanner or digital camera. The server/host 620 may be the same as the application server 506, or it may be different but operably coupled. The server/host 620 is a central hub that is operably coupled to the various databases and hardware used for image classification and search. The product images 600 uploaded to the server/host 620 are stored in the Product Images database 270. The imaging server 510 may then classify the images in accordance with method 200, calling upon the Product Definitions database 280 to provide product metadata and finally storing the indices in the Product Index database 290.

Customers may access the website interface on a plethora of digital devices such as tablets 652, laptop computers 654, desktop computers 656, smart phones or mobile phones 658, etc. The website interface accessed on such devices communicates with the application server 506 via a wide area network 650 in the form of the Internet. If a customer makes a request for a product, the availability of the product is determined from the Product Definitions database 280, and method 400 from FIG. 4 is carried out using the recommendation engine 508. The product may be selected from an image containing multiple products, such as a on a photo sharing website where an HTML link or hash redirects to a particular product or retailer offering the product available for purchase. The imaging server 510 may also be used depending on whether images need to be correlated to provide additional recommendations or alternatives, as described with respect to FIG. 5. Recall from method 100 that even if the requested product is available, method 400 may be used to recommend alternatives or to upsell the customer. The results from the request are then received and displayed at the digital device.

In addition the digital devices may include smartphones or cameras that generate images 600. As previously noted, in one embodiment a digital image may be acquired by a digital device, which may query the shopping interface to determine if the product in the image is available or if there are alternatives. The received images that are provided by the user or uploaded by other users on a photo sharing web site are classified to identify objects within the image. An image may contain multiple items which are each identified and classified. An image may therefore be associated with multiple products and associated SKUs.

Figure 7:
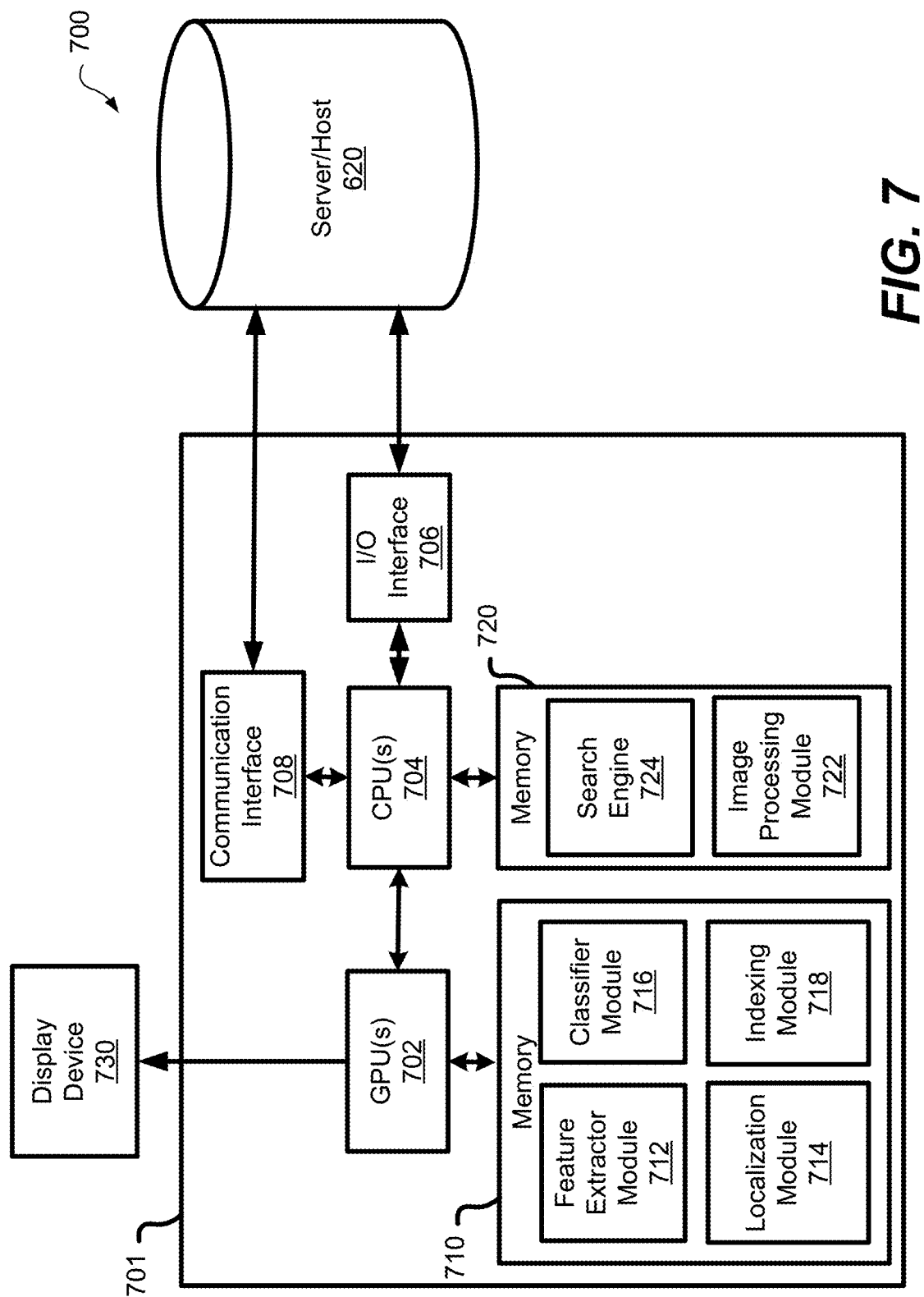
FIG. 7 shows a system for image classification and search.

FIG. 7 shows a computing environment 700 in which image classification and search may be implemented as computer software in the form of computer readable code executed by a one or more processors for image processing applications. In an embodiment, the computing environment comprises the imaging server and recommendation engine. The computing environment 700 may be any number of computing or computer based platforms such as servers, mobile devices, personal computers, notebook computers, personal digital assistants. A computer 701 comprises central processing unit (CPU) 704 and associated memory 720, and graphics processing unit (GPU) 702 and associated memory 710. The CPUs 704 and GPUs 702 may be a single processor or multiprocessor system for executing SISD or SIMD operations. In various computing environments, memory 710 and 720 and storage 770 can reside wholly on computer environment 700, or they may be distributed between multiple computers.

Input devices such as a keyboard and mouse may be coupled to a bi-directional system bus of a computer 701. The keyboard and mouse are for introducing user input to a computer and communicating that user input to processor 704 if required. Computer 701 may also include a communication interface 708. Communication interface 708 provides a two-way data communication coupling via a network link to a network by wired or wireless connection or may provide an interface to other host devices by a direct radio frequency connection. In any such implementation, communication interface 708 sends and receives electrical, electromagnetic or optical signals which carry digital data streams representing various types of information. The communication interface 708 may be operably coupled to the server/host 620 to communicate with the Product Images, Product Definitions, and Product Index databases. GPU 702 may be coupled to a display device 730 for displaying results or data related to search results or execution of the image processing or search engine.

Communication between the communication interface unit 708 and the network or host use electrical, electromagnetic or optical signals which carry digital data streams. The signals through the various networks and the signals on network link and through communication interface, which carry the digital data to and from computer. The computer 701 may also be able to display the results of the search to a user in the form of output if it is performed locally.

The CPU 704 or GPU 702 similar device may be programmed in the manner of method steps, or may be executed by an electronic system which is provided with means for executing for operation of the classification and search engine. The server/host 620 may also be accessed through an input/output (I/O) interface 706 and may include both fixed and removable media, such as non-volatile, flash, solid-state, magnetic, optical or magnetic optical storage systems, Random Access Memory (RAM), Read Only Memory (ROM) or any other available mass storage technology.

Memory 720 can provide code for providing high level operation of the classification and search system. An image processing module 722 provides a means of conveying images to the GPU 702 for processing in addition to receiving metadata from user input or by other association means. The image is processed by the GPU 702 connected to memory 710 which comprises a feature extractor module 712, a classifier module 716, a localization module 714 and an indexing module 718 which in combination provide the functions of the image processing layers. The search engine 724 enables an image query, either based upon an image or keywords to access the server/host 620 for retrieval of relevant images. Although the modules have been represented as being divided between CPU and GPU memory 710 and 720, they may be wholly executed by either processor.

Figure 8:
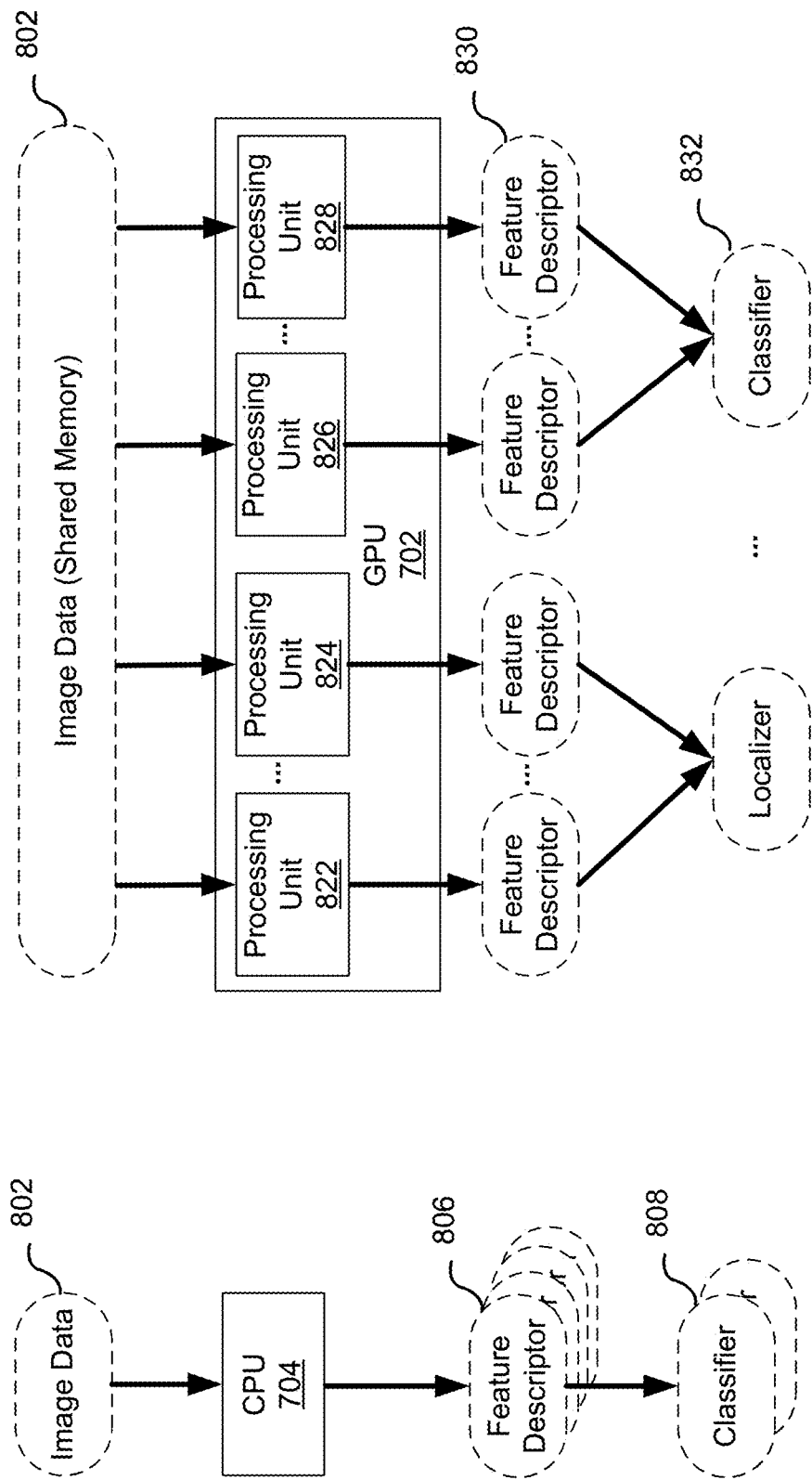
FIG. 8 shows a schematic representation of image analysis on GPUs and CPUs.

FIG. 8 shows a schematic representation of how the image classification and localization model may be performed on CPU 704 or GPU 702. In a CPU 704, operating in a SISD environment, each step of the execution of processing the image data 802 would be run serially. Feature descriptors 806 would be generated successively then appropriate classifiers 808 generated.

Modern programmable GPU 702 are fast becoming the ideal platform for large scale processing and provide SIMD execution. The GPU 702 is ideal for problems that are highly parallel in nature and can benefit from Single Instruction Multi Data (SIMD), Multi Instruction Single Data (MISD) or Multi Instruction Multi Data (MIMD) processing. Since the primate visual cortex operates in a retinotopic fashion, which is an inherently SIMD type of processing, the GPU is an ideal platform for modelling the visual cortex. All cellular processing, from feature descriptor isolation and comparison to object classification, can be implemented using for example OpenGL GLSL fragment shaders. When developing algorithms for the GPU 702, coprocessor bandwidth can become a significant bottleneck. It is crucial to minimize data transfer between the CPU 704 and GPU 702. Feature descriptors are only read from the GPU 702 after a hierarchical resonance (HAR) layer has been applied. At this point, the features for a given object class have been isolated and ranked. A subset of these ranked descriptors are selected for classification. This allows a uniform distribution of feature descriptors for each class. These descriptors are combined into a single texture for the classification shaders. In this example the image data 802 is provided in shared memory which can be processed in parallel by processing units 822, 824, 826 and 828 to generate feature descriptors 830 in parallel. Classifiers and localizers 832 can then be generated based upon the feature descriptors 830.

Figure 9:
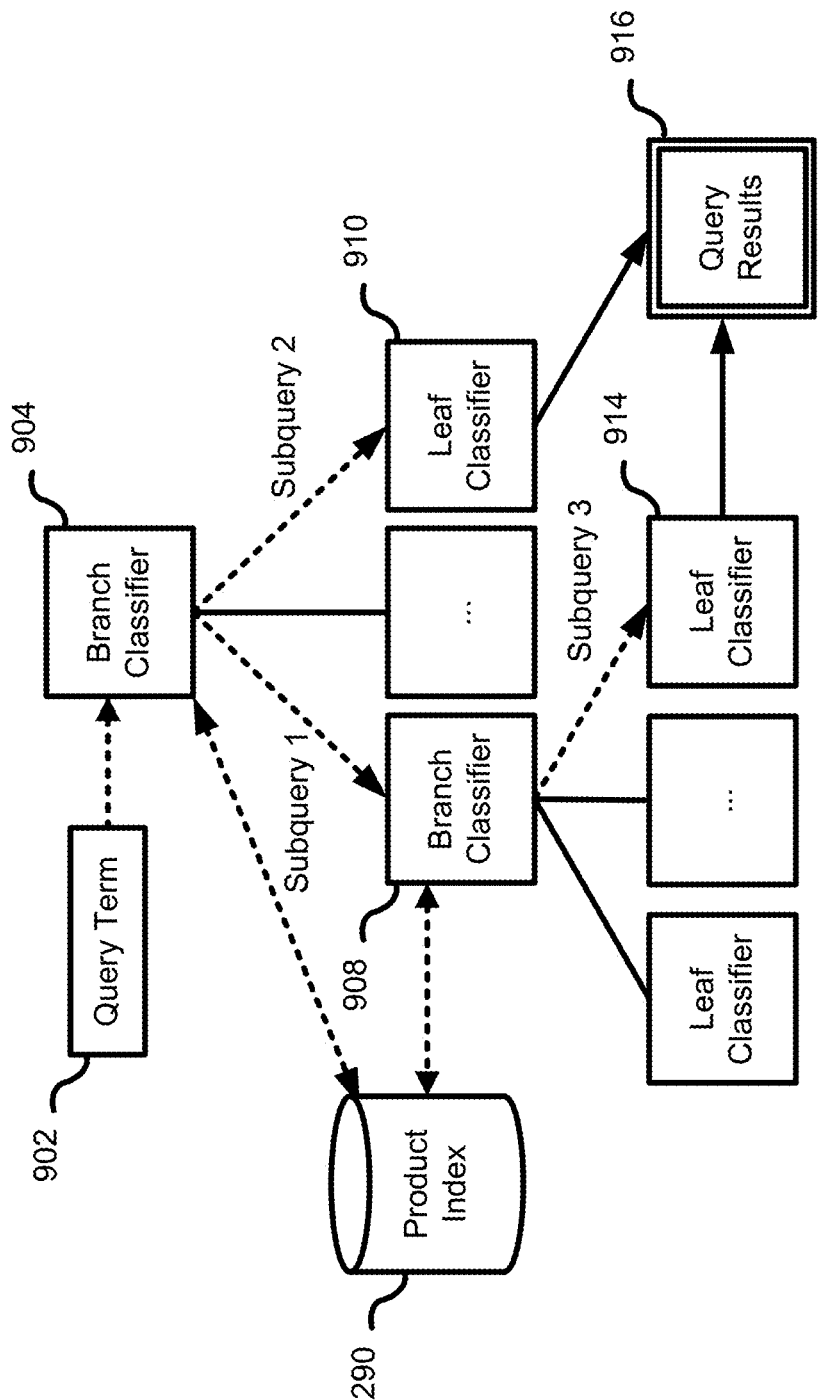
FIG. 9 shows a diagram of a tree of classifiers.

FIG. 9 shows a diagram of a tree of classifiers. For example, this classifier hierarchy may be used when querying the Product Index 290 with keywords obtained from customer filters. When a search is performed by the recommendation engine and imaging server, the keywords that are associated with the classifiers are mapped back to the query term 902. For example a high level term (such as men's shirts') can be associated with the main branch classifier 904. The additional terms that define subqueries such as subquery 1 (such as 'collars') which is mapped to a branch classifier 908 and subquery 2 (such as 'buttons') which is mapped to a leaf classifier 910. The branch classifiers 904 and 908 can be mapped with the Product Index database 290. In addition, dependent on the granularity of the branch classifier additional terms may be mapped based upon additional sub-query terms, such as sub-query 3 (such as 'striped') to further direct to a leaf classifier 914. Based upon the hierarchy in the Product Index 290, the images of similar products associated with leaf classifiers produces a query result 916 which can then be returned. Accordingly, this may be used to return results for similar products.

Figure 10:
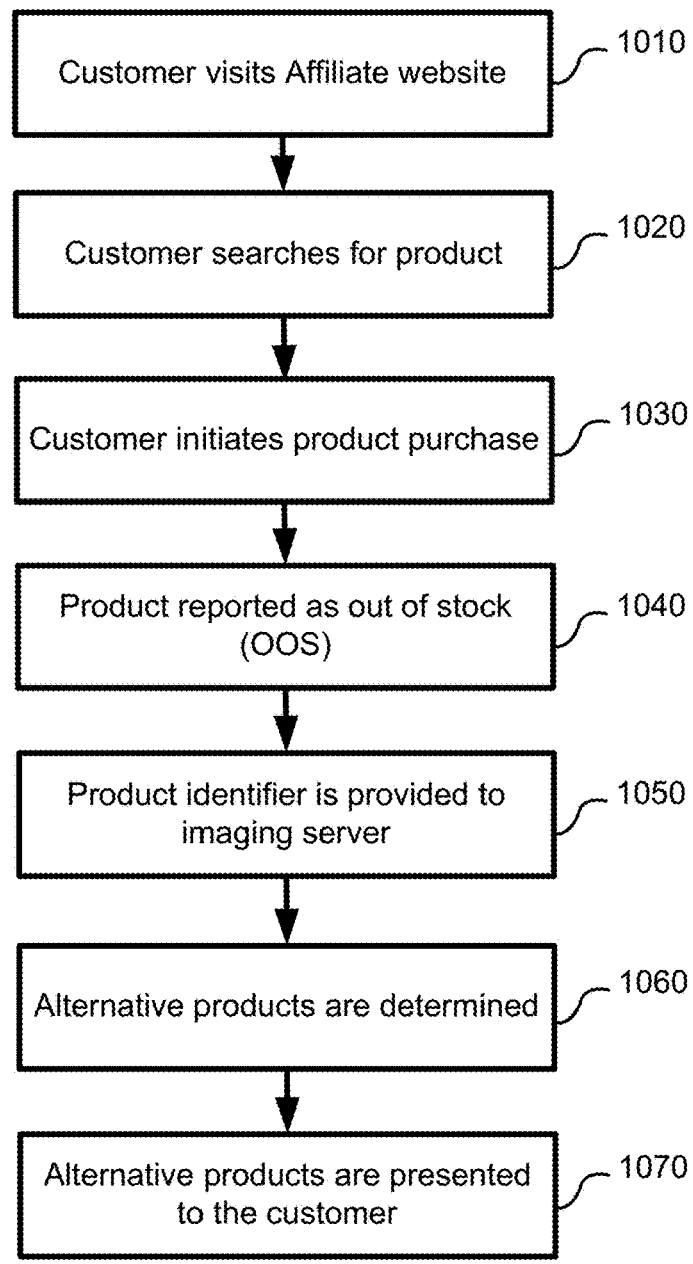
FIG. 10 is a simplified flow diagram of a method of addressing out of stock products by an affiliate site.

FIG. 10 shows a non-limiting flow chart example 1000 of how an affiliate site may implement the subject matter disclosed. A customer first accesses a shopping interface supported by an affiliate site (1010) and searches for products (1020). The affiliate site provides the product purchase request to the retailer (1030), where the product may be reported as out of stock (1040). The product identifier is then provided to an imaging server (1050), where together with the recommendation engine identifies alternative products using the method 400. Accordingly, alternative products are recommended (1060) and displayed to the customer (1070).

When the customer initiates a product purchase (1030) they may be redirected from the affiliate website to the online retailer. In one embodiment, out of stock products may be identified prior to this product request, and similar in-stock products may have already been determined (1050, 1060). Accordingly, the outbound links that would take a customer to a product page that is out of stock can be updated to point to the similar in-stock alternatives based upon image classifiers of the associated object. Alternatively items within an image may be processed to re-associate links with valid products particularly if links are to out of stock products.

In another embodiment, a customer may search for a product (1020) and select a corresponding image or select an item from an image photosharing website such as Pinterest™ (1030). However, perhaps the image actually contains multiple products. For example, the customer may be searching for a purse and select an image of a woman holding a purse but who is also wearing a dress. Using the image classification and searching methods described, all relevant products in the image may also be detected, regardless of where the image points, and the outbound link or links could be redirected to a relevant landing page on the retailer's site. For example, a customer may click the image of the woman holding a purse and wearing a dress, and is redirected to two landing pages: one for the purse and one for the dress. In an embodiment where perhaps that exact dress is not available, the image searching and classification could be used to find and recommend similar products, and subsequently direct the customer to those landing pages. This embodiment could be further applied in other non-limiting examples previously described where a customer queries for a product or similar products based on images taken on a digital device or found online.

Figure 11:
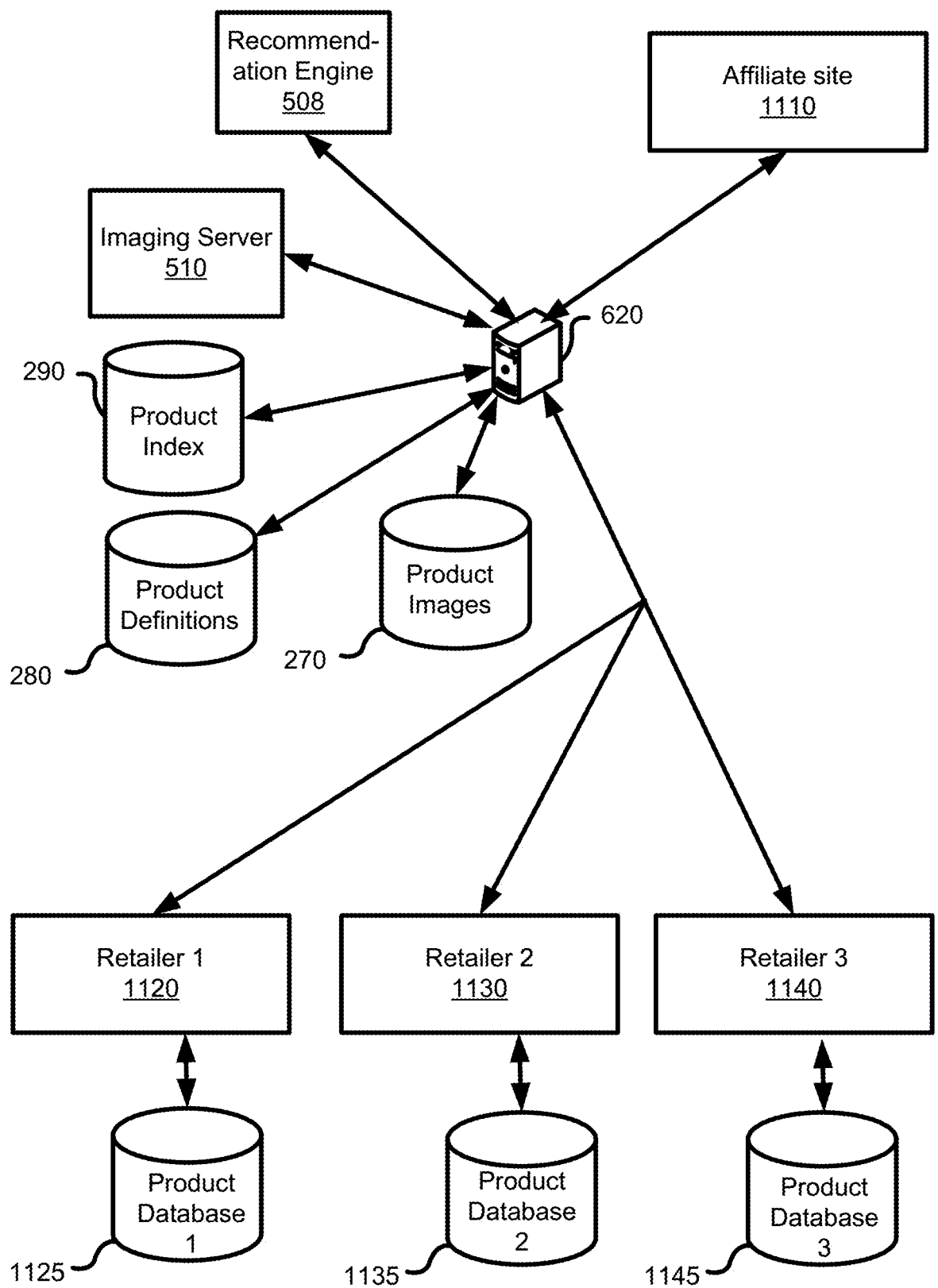
FIG. 11 is a simplified system diagram for a possible relationship between online retailers and affiliate sites.

FIG. 11 shows a non-limiting example of a possible relationship between affiliate sites and online retailers. In this example, the affiliate is using the server/host 620 where it may store product images in the Product Images database 270, product metadata and stock levels in the Product Definitions database 280, and product classifications and indices in the Product Index database 290. There may be a variety of online retailers using the affiliate site 1110. Each retailer 1120, 1130, 1140 may have their own product databases 1125, 1135, 1145. In this example, the retailers 1120, 1130, and 1140 are operably coupled with the server/host 620 of the affiliate site 1110. The server/host 620 receives product images and information from the retailers and may perform image classification and storage as previously described in method 200. When the affiliate site 1110 receives a request from a customer, it can provide alternative products if the requested product is out of stock, or to upsell the customer, using the recommendation engine 508 and imaging server 510. In some embodiments, if a product is found to be out of stock the request may be directed to the appropriate retailer to determine if there is any more of that product available.

Figure 12:
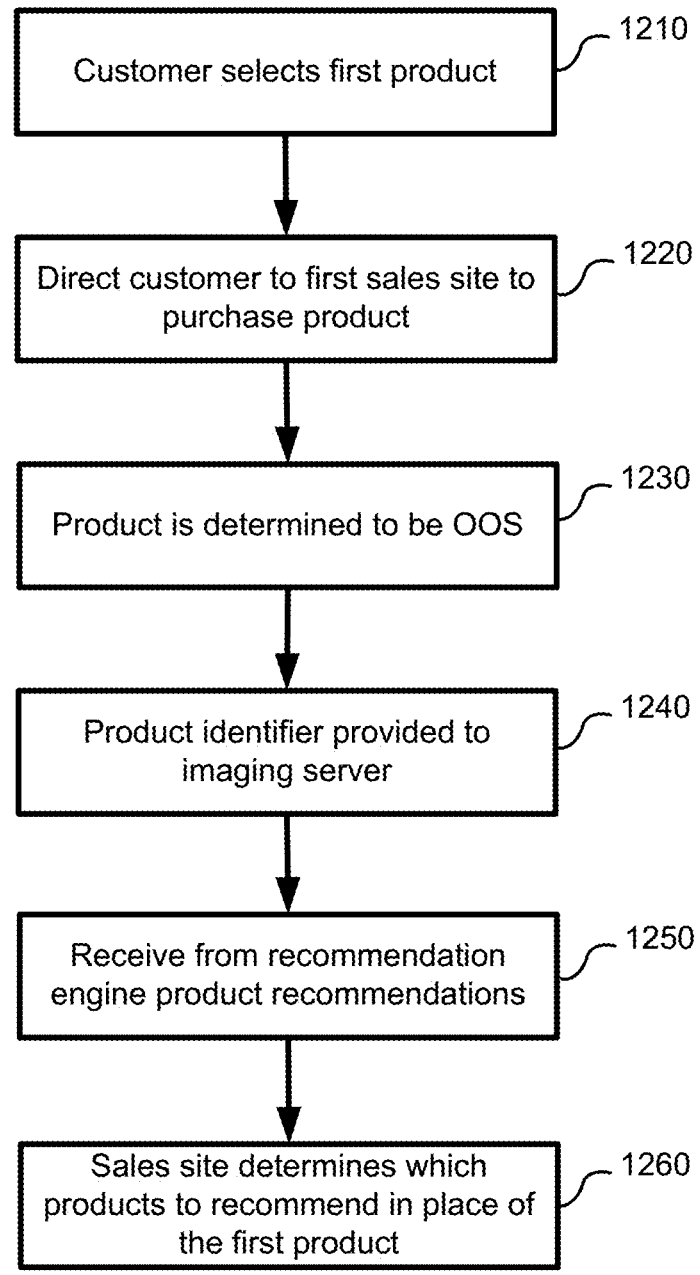
FIG. 12 is a simplified flow diagram of a method of addressing out of stock products by an online retailer.

FIG. 12 shows a non-limiting example of how a direct online retailer may implement the subject matter disclosed. A first product is selected for purchase by a customer from an online retailer (1210). The customer is redirected to a product sales web site or PDP (1220) where, unfortunately, the product is out of stock (1230) as provided by a stock count or stock indicator. The product sales website provides the product identifier for the product to the imaging server (1240) and the recommendation engine returns a listing of similar looking products with associated metadata such as Stock Keeping Unit (SKU) identifier, quantity of the product, origin of the product, price of the product, economic classification of the product, use of the product, construction material of the product, user ratings for the product, etc. (1250). Based on the retailer goals, the retailer displays a selection of the returned results to the customer (1260). For example, the retailer only may show the shoes that are available in their online store. Alternatively, the retailer may show only more expensive products than those sought by the customer. Yet alternatively, the retailer may show a grouping of available products having similar price and materials as well as a few options that are significantly less costly and significantly more costly, giving the customer additional choice.

Figure 13:
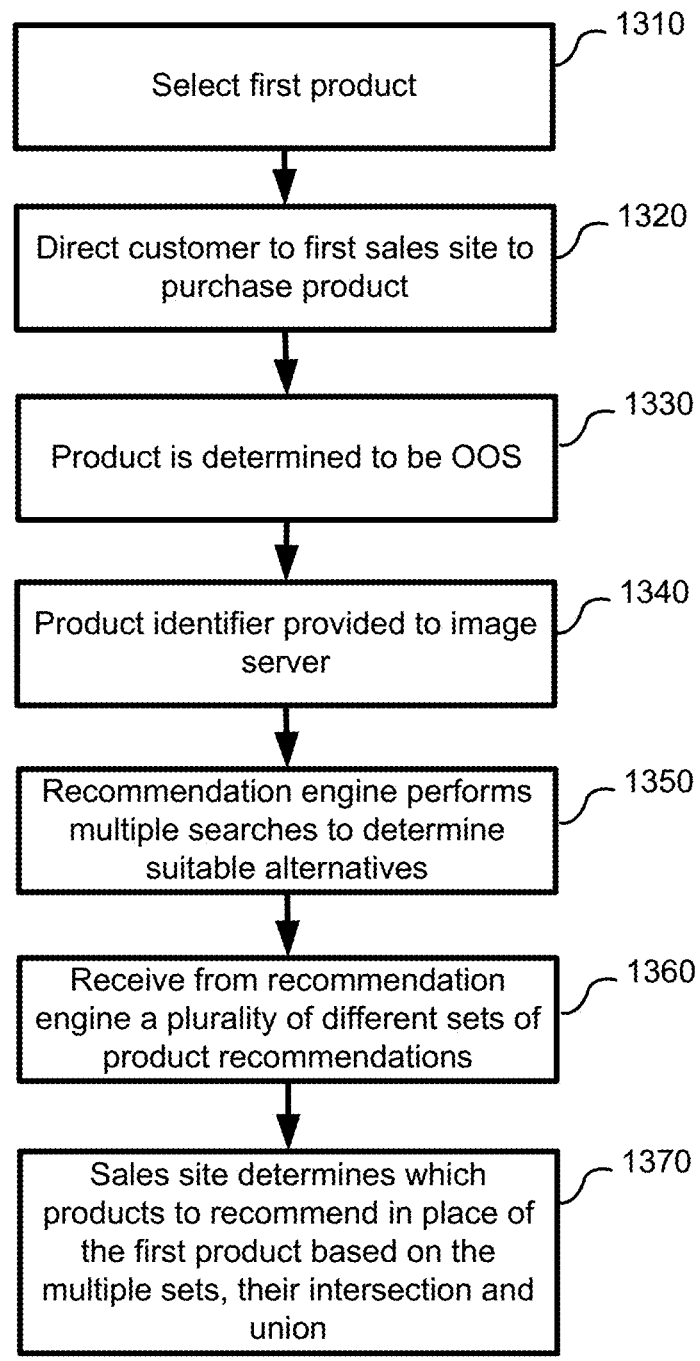
FIG. 13 is a simplified flow diagram of another embodiment wherein multiple image indices are formed using different correlation engines and/or different correlation criteria.

Referring to FIG. 13, shown is another embodiment wherein multiple image indices are formed using different correlation engines and/or different correlation criteria. A first product is selected by a customer from a sales site for purchase (1310). The customer is redirected to a product sales web site or PDP (1320) where the product is out of stock (1330). The product sales website provides the product identifier for the product to the image server (1340) and the resulting processes returns different image search results. Each search process is engaged and the different results are then mixed according to aggregation criteria to produce a final list of results (1350). The recommendation engine returns a plurality of different sets of product recommendations (1360), and the sales site determines which products to recommend in place of the first product based on the multiple sets, their intersection and union (1370). In some embodiments, only overlapping results are displayed and in others all results from some vendors are always displayed. In some embodiments, further processing allows for better resolution of result discrepancies.

While the foregoing description has generally been directed to using image classification and searching for returning e-commerce product requests, it would be readily appreciated that being able to identify objects in images and classify said objects can be used for broader applications. One particular example is for determining trends in society.

Figure 14:
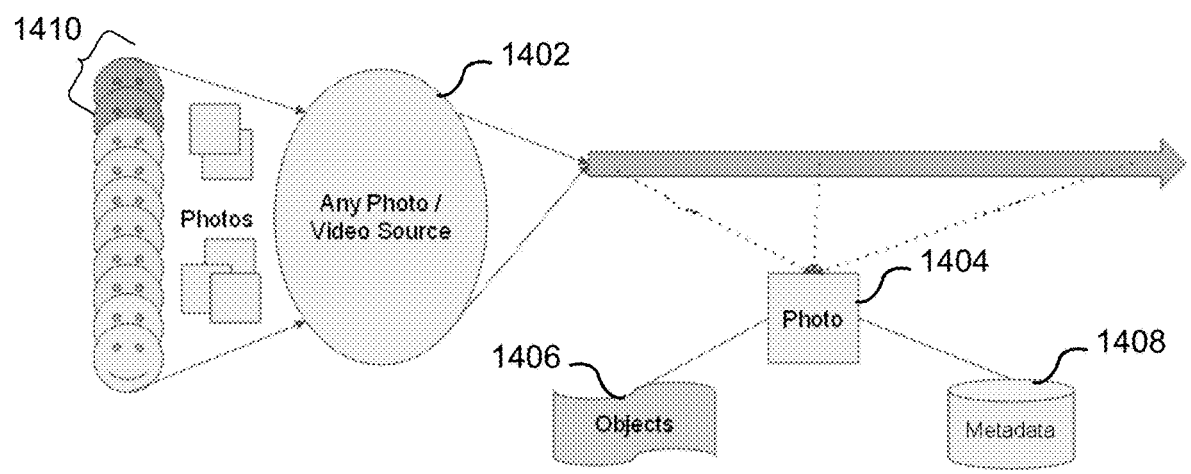
FIG. 14 shows a representation of classifying images for use in identifying trends.

FIG. 14 shows a representation of classifying images for use in identifying trends. Images from any photo or video source 1402, including but not limited to social media platforms such as Twitter®, Instagram®, Facebook®, and YouTube®, or televised events such as Fashion Week, can be retrieved and analyzed to determine objects in images and attributes of those objects in a similar manner as has been described with respect to the methods shown in FIGS. 1-3, for example, and using features of the computing environment shown in FIG. 7, for example. By tracking the presence of objects and/or attributes of objects in the images over a period of time, trends can be identified.

As depicted in FIG. 14, for a given photo 1404, object(s) 1406 in the photo 1404 can be determined as well as image metadata 1408. As described further below, a visual token associated with the photo 1404 may be generated that includes information such as a classification of the object(s) 1406 in the photo 1404 and attributes of the object(s) 1406. Further, a textual token comprising the image metadata 1408 may be generated, which may include information such as a timestamp of the image, descriptive details associated with the image, a popularity of the image, and a location of the image. Descriptive details may for example include a social network, a user name, a caption, any URLs associated with the image, pixel coordinates associated with products or brands present in the image, and details about the subject in the image. A caption can include descriptions of the scene, product(s), and may include hashtags, as well as brand/account mentions. As would be appreciated, by storing the visual tokens and the textual tokens in a database that stores a plurality of visual tokens and textual tokens that have been generated for various images over time, trends related to the object (e.g. a particular clothing piece, such as loafers) and/or an attribute of the object (e.g. a particular color) can be identified by an increasing presence of the object and/or the attribute of the object in the visual tokens over time. It would also be appreciated that the identification of objects in a photo is not limited to pieces of clothing, but may also include accessories, body parts (e.g. hair, eyes, etc.), makeup, food and drink, consumer goods, and so forth, as described in more detail below.

It would also be appreciated that certain photos or videos are associated with "influencers", identified in FIG. 14 as influencers 1410, such as those with a large social media following and/or who may be trend-setters. Influencers are generally people and organizations, but could also be celebrities, athletes, etc., on social media platforms such as, but not limited to, Instagram™, YouTube™, Snapchat™, Tiktok™, etc, that affect consumer demand by promoting/using/wearing certain products via social media, televised events, etc. Likewise, many photos or videos are associated with the "mass", or those people who follow trends but are not trend-setters. Further, there are "late adopters" who generally do not follow trends until they have been well established. It is particularly advantageous to identify trends in their early stages, before they have been adopted by the "mass". Therefore, image classification in this embodiment may in particular be performed on photos or videos of influencers, who may be identified in advance of performing image classification (e.g. based on a number of social media followers, etc.), or who may be identified during the image classification process (e.g. based on the image metadata), or still further, based on a recursive logic after trends have been identified and then identifying those users that were influencers of that trend and labelling them as influencers for future analysis.

Figure 15:
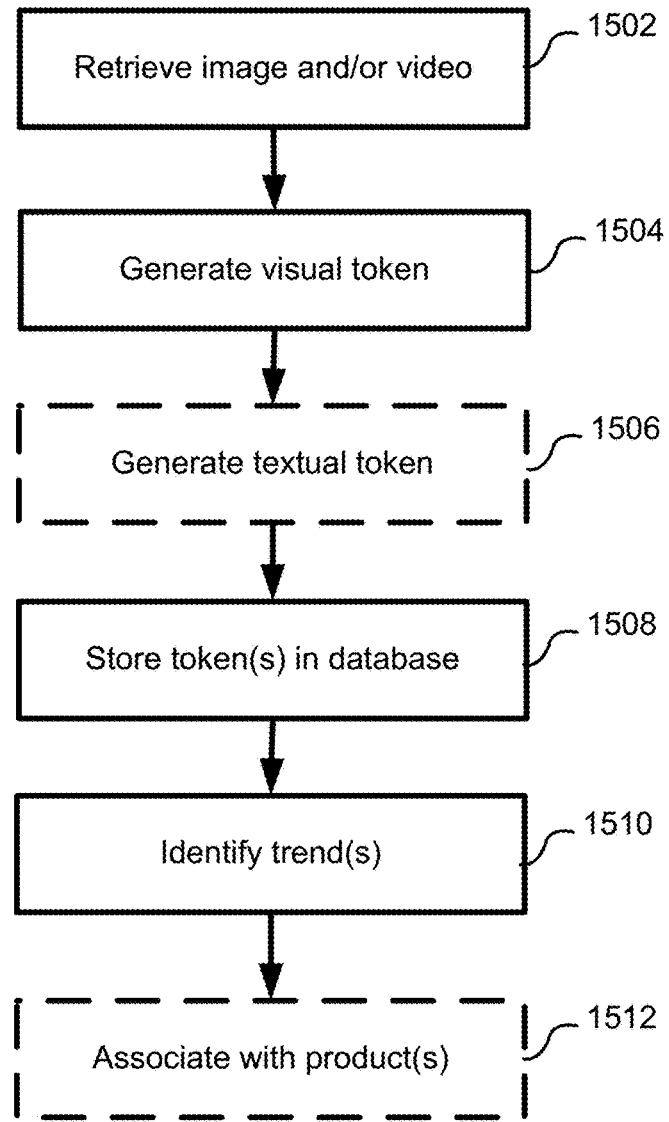
FIG. 15 shows a method of identifying trends using image data.

FIG. 15 shows a method 1500 of identifying trends using image data. As described above, trends may in particular be identified by analyzing image data of influencers, however all types of photos or videos may be analyzed depending on the insights being sought after. The method 1500 may comprise identifying influencers, which may be performed prior to initiating any image analysis, or which may be performed during the image analysis.

The method 1500 comprises retrieving an image and/or video (1502). As would be appreciated, a video can be broken down into a number of still images, which may be analyzed using the methods disclosed herein. The images and/or videos may be retrieved from various sources, including but not limited to one or more social networking sites, a private image collection, cameras inside stores or buildings, etc. The images and/or videos may be received/downloaded and stored for performing the analysis.

Figure 16:
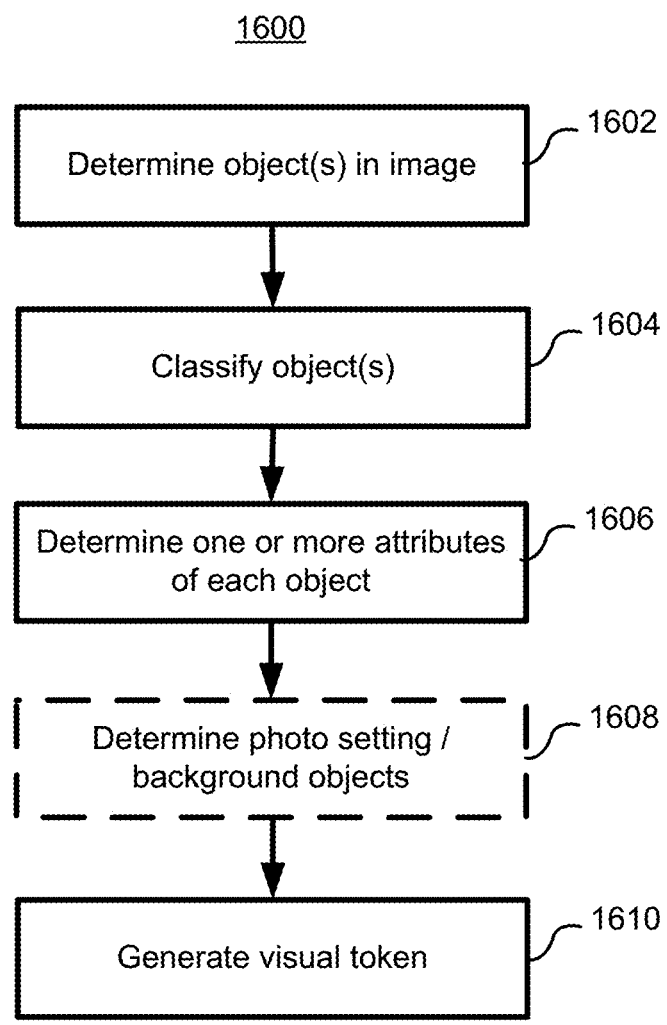
FIG. 16 shows a method of generating a visual token.

A visual token is generated for the image(s) (1504). The visual token comprises information including objects and attributes of objects that are identified in the image. FIG. 16 shows a method 1600 of generating a visual token. The method 1600 may be similar for example to the features 220 to 240 of the method 200 shown in FIG. 2. In the method 1600, one or more objects are detected in the image (1602), for example by performing foreground detection on the image. The same object may be present multiple times in the image, such as a consumer good such as a backpack or coffee cup, for example. The object(s) are classified (1604), for example in accordance with an object category defined a priori. The object(s) may be classified according to feature descriptors that have been generated during an analysis of the image data, for example in accordance with the method 300 described with respect to FIG. 3. One or more attributes of each object are determined (1606), which may also be determined according to the feature descriptors. Attributes of the object(s) may include colors of the object, specific styles or features of the object, etc. For example, if the target object is a shoe, examples of specific styles or feature of the shoe may include the type of shoe (such as boot, sneaker, slipper, sandal, etc.), the dominant and minor colors of the shoe, the height of the shoe's heel, any logos on the shoe, whether the shoe has laces or straps, the thickness of laces or straps, the color of laces or straps, how many straps are present, the height of the shoe's sole, whether a bow or flower is present on the shoe, the presence and type of frontal toe opening, etc. The method 1600 may also further comprise determining a setting or scene in the image, and/or determining background object(s) 1608. Aspects of the method 300 may be employed to perform this determination, with a focus on feature descriptors and objects in the background of the image. A visual token is generated (1610) for each of the objects detected at (1602), and comprises information including the object category determined at (1604) and the object attributes determined at (1606). The visual token may also comprise a count of the number of the objects detected in the image (e.g. if there is more than one of a type of object). A visual token may also be generated that comprises an indication of background objects, and/or a photo scene/setting, which may be determined at (1608). Multiple visual tokens may thus be generated for a single image. It would also be appreciated that where a video is being analyzed, multiple still images may be analyzed corresponding to different times of the video and in particular where different objects are present in the video. Multiple visual tokens may thus be generated for multiple images from one video.

Referring back to the method 1500 of FIG. 15, a textual token may also be generated for the image (1506). As described with reference to FIG. 14, a textual token may comprise image metadata including information such as a timestamp of the image, descriptive details associated with the image, a popularity of the image, and a location of the image. The descriptive details may for example include a social network, a user name, a caption, any URLs associated with the image, pixel coordinates associated with products or brands present in the image, and details about the subject in the image. A caption can include descriptions of the scene, product(s) and may include hashtags, as well as brand/account mentions.

The visual token is stored in a database (1508), and the textual token when generated may also be stored in the database. The database stores a plurality of visual tokens (and textual tokens) that have been previously generated from a plurality of other images.

The visual tokens (and textual tokens) in the database are analyzed to identify a trend in an object and/or an attribute of an object (1510). For example, an analysis of visual tokens may indicate an increasing presence of the object and/or the attribute of the object. When the visual tokens are stored in the database at (1508) they may be timestamped, and therefore the increasing presence of the object and/or the attribute of the object with respect to time can be identified. Additionally, if a textual token is stored in the database and comprises information including a timestamp of the image, this image metadata may be used in the analysis to identify the increasing presence of the object and/or the attribute of the object over time.

Other image metadata determined and stored in a textual token may also be utilized to help identify trends. For example, weightings may be applied to the presence of the object and/or the object attributes in accordance with a popularity of the image such as the number of social media followers that the image was posted to, the number of views, the number of reactions to the image (e.g. "likes", comments, etc.). Thus, the presence of an object and/or particular attribute of an object in an image may be given a higher weighting in determining a trend if the image is more popular and has more penetration.

Trends may also be identified for specific groups of people, for example in social media influencers by age and/or geographic region, etc. Image metadata such as a location of the image, and/or an age or other details about the subject in the image, which may be determined and stored in a textual token, may be analyzed to help identify trends for specific groups of people. A person skilled in the art will also appreciate how other types of image metadata may be useful for identifying trends.

Trends may also be identified by correlating the presence of an object or an attribute of the object with other features (e.g. objects, attributes, setting) of the image. For example, an object in the image may be a person's hair, and attributes of their hair may be their dominant hair color, hair length, hair curliness, hair styling information, the presence and color(s) of hair dye, categorizations of hair dye techniques that were used such as highlights vs no dye vs full dye vs other techniques, the glossiness of the hair, etc. Another object in the image may be a specific shirt of a specific pattern, and a trend of that shirt with that pattern may be identified for people with that color and/or length and/or curliness of hair. Each of the visual tokens generated from an image may be stored in association with one another, thereby permitting a correlation of objects.

Trend data of identified trends may be communicated to an external device. Further, any identified trend(s) may be associated with product(s) (1512). For example, product images from various retailers may be classified and stored in a database as has been described with reference to FIGS. 1 and 2. Additionally, a database such as Product Definitions database may store metadata for products for one or more retailers. An object and/or object attribute that has been identified as a trend may be associated with one or more products by accessing one or both of these databases. Retailers and manufacturers may be notified of trends and of any products associated with trends so that they can develop more products directed to the trend and/or manufacture more of existing products directed to the trend. In a further implementation, where stock level data is stored in the Product Definitions database for example, a stock level of the various products associated with a trend can be determined, and retailers and/or manufacturers can be notified if stock levels are too low to support the growth of the trend. Examples of products recognised include specific SKUs for a certain brand of shoe, a SKU for a bottle of hair dye of a specific color which can be used to dye a subject's hair, a SKU for a type of glitter which can be applied to a person's face, or SKU related to a specific species/sub-species of fruit which can be used to create a dessert. It is understood that when these objects and attributes are presented in a real world photographic context, they are considered products.

Figure 17:
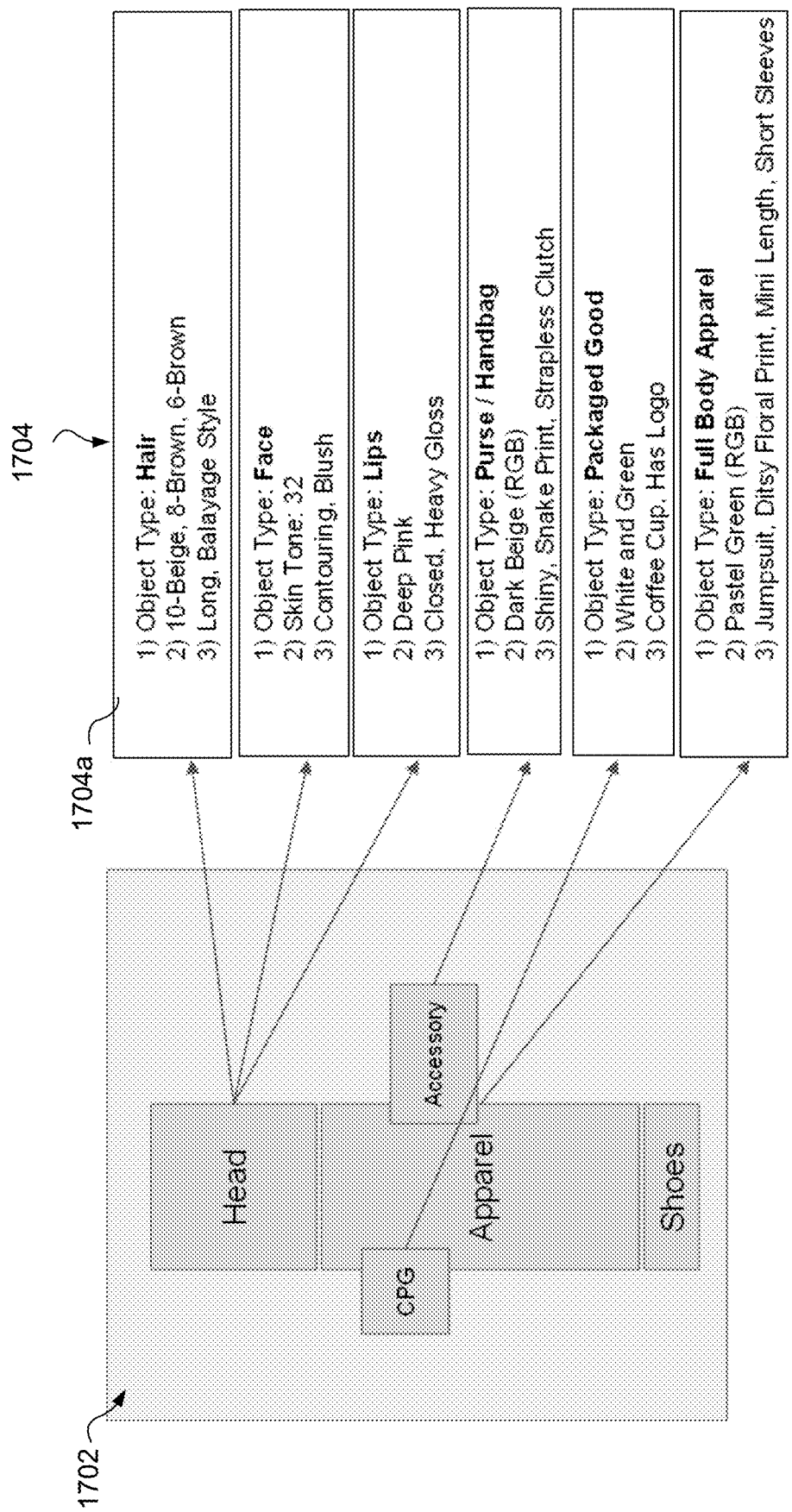
FIG. 17 shows a representation of generating visual tokens from a social image.

FIG. 17 shows a representation of generating visual tokens 1704 from a social image 1702. A method for generating visual tokens has been described with reference to FIG. 16. As shown in FIG. 17, the visual tokens 1704 each comprise information including an object category or an object type, and attributes of the object including color(s) of the object and other attributes or features of the object. For example, visual token 1704a includes information that the object is the person's hair, and attributes of the person's hair include hair color according to a color scale, and also the hair style including that the hair is long and shows a balayage hair dye technique. Other examples of visual tokens are also shown in FIG. 17 that may be generated for the image 1702.

Figure 18:
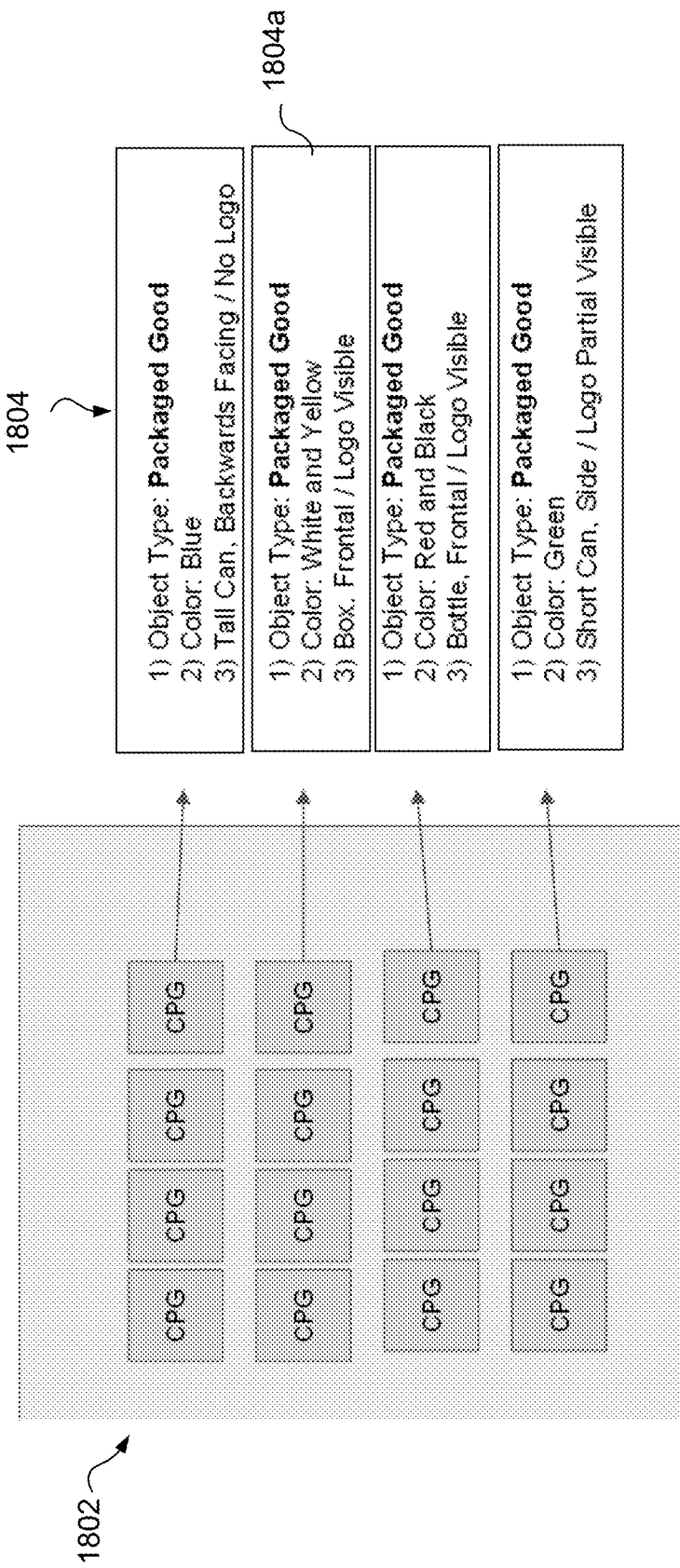
FIG. 18 shows a representation of generating visual tokens from another type of image.

FIG. 18 shows a representation of generating visual tokens from another type of image. This image 1802 is captured in a retail environment and may for example be captured by a camera that can be affixed to a robot, positioned on an adjacent shelf, or taken by a person using a mobile device, or similar. As shown in FIG. 18, the visual tokens 1804 each comprise information including an object category or an object type, and attributes of the object including color(s) of the object and other attributes or features of the object. For example, visual token 1804a includes information that the product is a boxed good, with a white and yellow color, and also the box is facing towards the camera and has a logo visible. Other examples of visual tokens are also shown in FIG. 18 that may be generated for the image 1800. Each product facing in the shelf photo is able to be matched to products in the product database, which may for example be utilized for identifying trends in products, for example based on the levels of the product and how quickly consumers are purchasing them. The visual tokens may also be analyzed to determine stock levels in the store, which may be used to notify retailers when stock levels of a certain product are low, and can also be analyzed for ensuring store planograms are correctly implemented. The image can also be used to determine if products are out of stock, missing, stolen or misplaced by determining expected locations, product numbers or positioning. The images can be correlated between time periods to determine trends in positioning of products, times when products are purchased and correlations with trends related metadata such as sales, social media trends or product advertisements.

Figure 19:
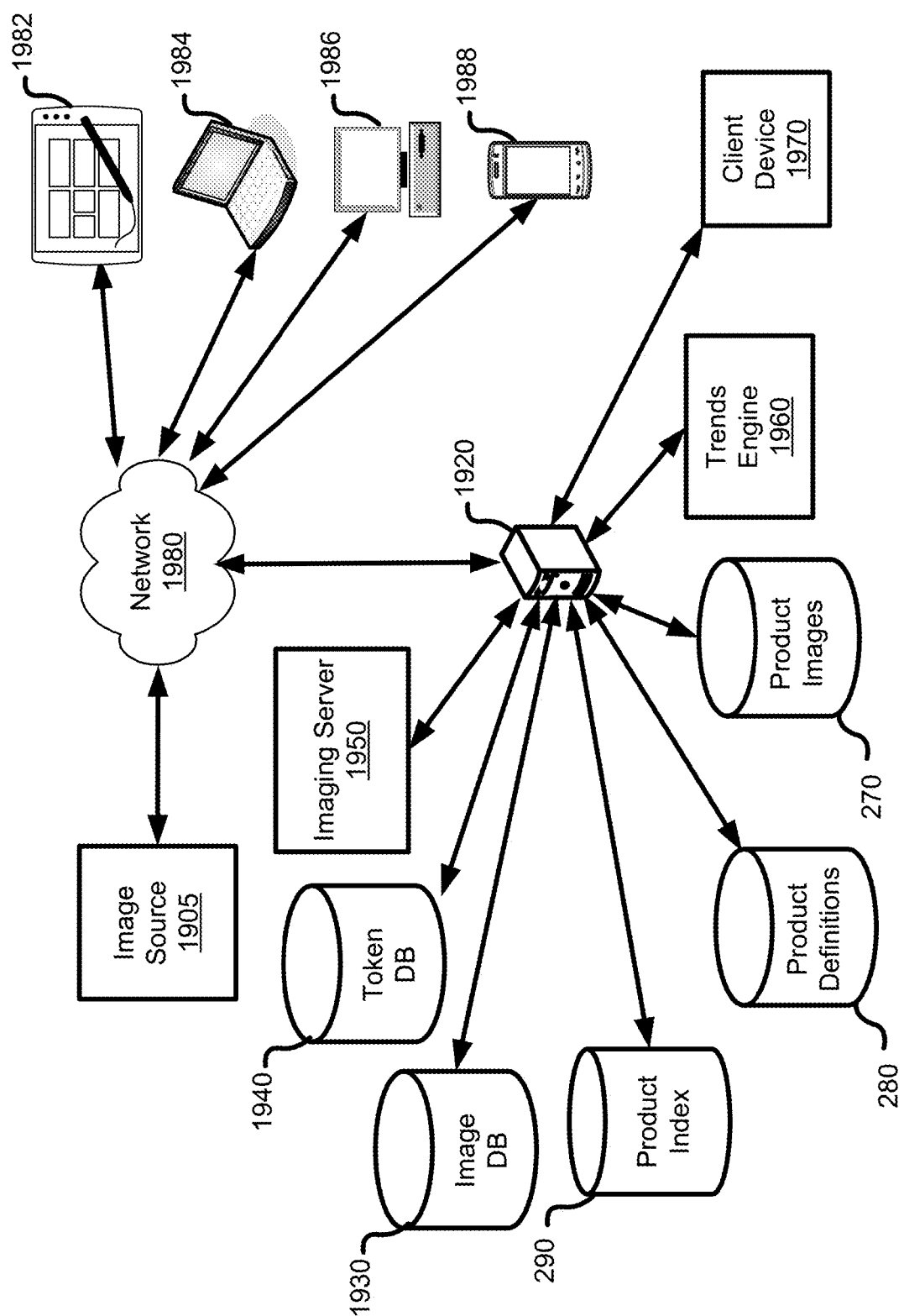
FIG. 19 shows a system for identifying trends using image data.

FIG. 19 shows a system for identifying trends using image data. A plurality of devices may be used to upload images and/or videos to an image source 1905 over network 1980. In one example, social media users may access various social media platforms via network 1980 and post photos or videos from a plethora of digital devices such as tablets 1982, laptop computers 1984, desktop computers 1986, smart phones or mobile phones 1988, etc. In another example, photos/videos from cameras, such as cameras located in stores, and/or cameras recording live or previously recorded events, may be uploaded to the image source 1905. A server/host 1920 of the system for analyzing the image data is configured to retrieve images/videos from the image source 1905 via the network 1980, and may store the images/videos in an image database 1930. As previously described, images and videos that are retrieved for identifying trends may in particular be those of influencers. In another example, the server/host 1920 may receive images/videos directly from a client device 1970, which may provide an image collection being shared with the server/host 1920 for image analysis. The received images/videos may be stored in the image database 1930.

Imaging server 1950, which may substantially correspond to imaging server 510 previously described, is configured to analyze the images and generate visual tokens and textual tokens. The generated tokens may be stored in a token database 1940. A trends engine 1960 may access the token database 1940 to identify trends in the image data by analyzing the visual tokens and textual tokens. A client of the system, such as a retailer, manufacturer, designer, etc., may be notified of identified trends via communication between the server/host 1920 and a client device 1970 via various types of communication methods. In some aspects, the server/host 1920 may provide a user interface through which the client device 1970 interacts with the server/host 1920, and any outputs could be displayed in the user interface and viewed on the client device 1970. The client device 1970 may thus be an external client device and/or a device of a back-end operator of the system of which results from the trend analysis are output to.

As has been previously described, retailers may provide product images stored in Product Images database 270, which may be classified and stored in a database such as Product Index 290. Further, retailers may provide product definitions for their products that include product metadata and stock levels, as represented in Product Definitions database 280. Any trends identified by the trends engine 1960 may be used to determine associated products by accessing any one or more of the Product Images database 270, Product Definitions database 280, and/or Product Index database 290. Such products that are determined to be associated with trends may be identified for the clients. Further, if product stock levels are provided from retailers, such as in the Product Definitions database 280, or determined from images of stores as for example described with respect to FIG. 18, the system can provide information including whether more stock needs to be bought and when, thus providing stocking and operations guidance in accordance with the identified trends. An example of providing an activation based on trend data is described with respect to FIG. 25.

A person skilled in the art will also appreciate that there are various other uses of trend data, including but not limited to: providing product guidance on what to create or iterate to designers, providing market guidance on timelines, providing sales/education guidance (i.e. in salon, in store, on shelf, etc.), providing M&A guidance and information on competitors, etc. Client device 1970 may also query the server/host 1920 seeking trend information on an object (e.g. "jumpsuit") and attributes of the object (e.g. "dress +tie dye"). The trends engine 1960 may access the token database 1940 to report on trend information, such as information on trend growth, common attributes of objects matching the query, other objects (and their attributes) commonly associated with objects matching the query, etc.

Figure 20:
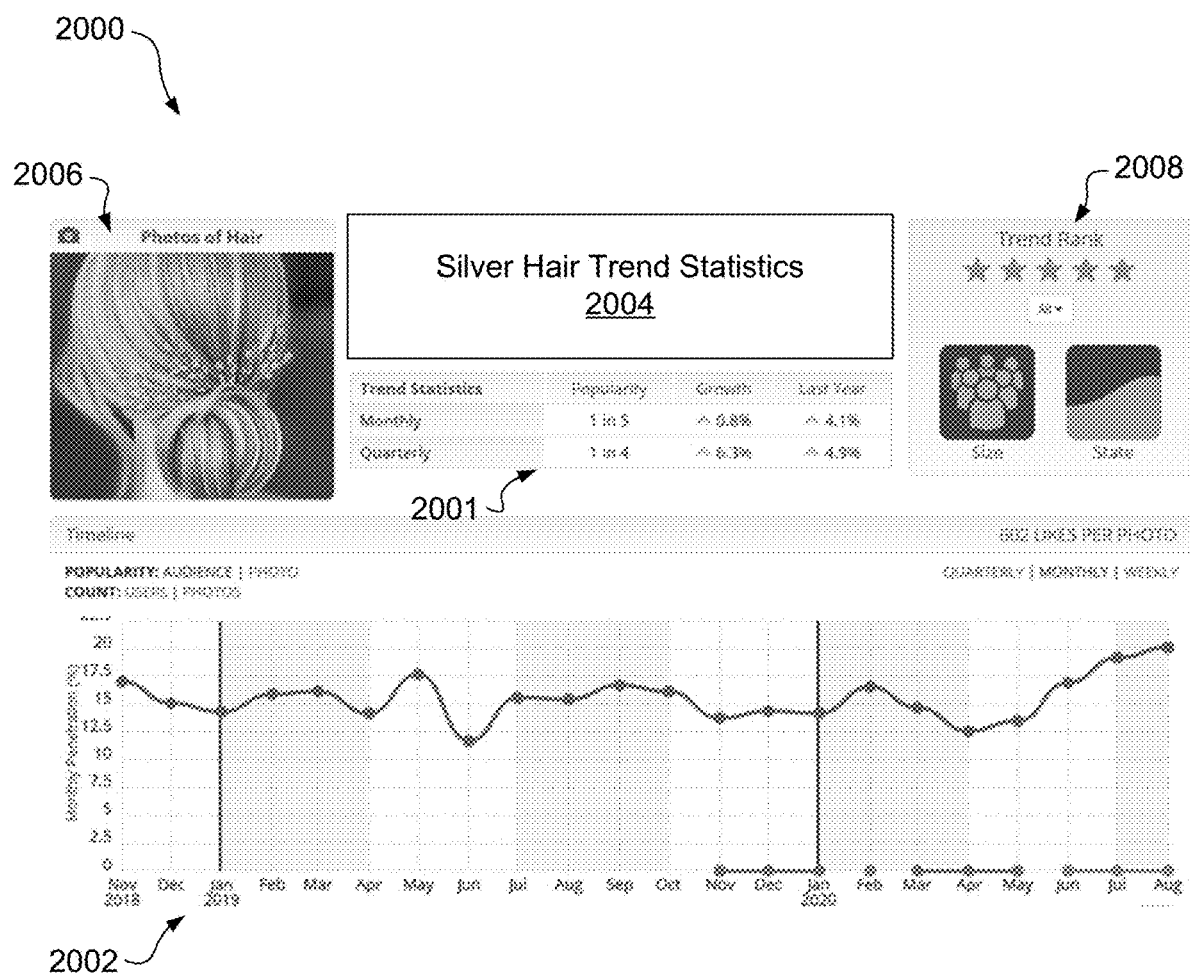
FIG. 20 shows an example of a trend that has been identified using the image data.

FIG. 20 shows an example of a trend that has been identified using the image data. In particular, FIG. 20 shows an output 2000 that may be generated by the trends engine 1960 shown in FIG. 19. In this example, a trend in silver hair has been identified. That is, the object in the image data is hair, and a trend has been identified in an attribute of hair, i.e. that it is silver. Various statistics 2004 can be reported on the trend. For example, an analysis of the visual tokens may provide statistics such as that silver hair has been in growth for six of the past twelve months, that peak popularity was a month ago in August 2020 when it was being posted by one in five accounts, and that the largest year over year jump was three months ago from June 2019 to June 2020. Certain trend statistics such as month and quarterly popularity and growth may be represented in a table 2001, and/or a graph 2002 which in this example shows penetration percentage over time on a monthly basis. The output 2000 may also contain one or more photos 2006 relating to the trend, a trend ranking 2008, etc.

Another exemplary use of trend data is to compare trend data relating to an object of interest for two or more different groups of interest over a defined time period. For example, in one implementation it may be desirable to compare trends between retailer data (e.g. product inventory, either current or future) and one or more influencers (e.g. social media influencers) that may influence the demand for the retailer's products. Such trend analysis may for example be used to provide product guidance on what to create or iterate to designers, provide market guidance on timelines and when to order/stock certain products, provide M&A guidance and information on competitors, etc.

Figure 21:
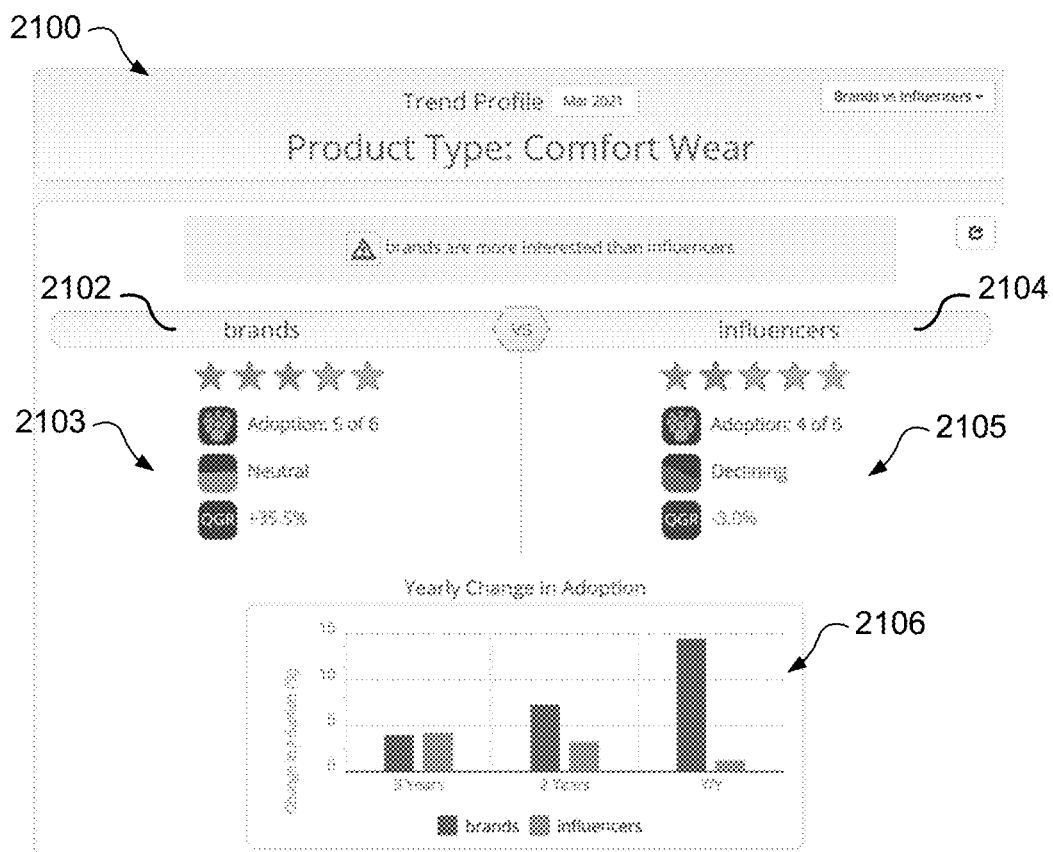
FIG. 21 shows an example of an output generated based on a comparison of trend data generated from image data sets corresponding to two groups to be compared.

FIG. 21 shows an example of an output 2100 generated based on a comparison of trend data generated from image data sets corresponding to two groups of interest, namely brands 2102 and influencers 2104. In this example, trend data is compared between one or more brand(s) (e.g. manufacturers and/or retailers) and influencer(s) for a particular product type, namely comfort wear.

Such trend data can be generated by an analysis of visual tokens (and textual tokens) that have been generated from images associated with each of the groups of interest (i.e. brands and influencers in FIG. 21) over a particular time period. With reference again to FIG. 19, images retrieved from the image source 1905, which as described above may be retrieved from the Internet, social media sites, television content, etc., and/or images otherwise received (e.g. product images received from a client device), may be stored in the image database 1930 in association with image data sets that relate to the source of the image. Accordingly, to analyze and compare trends between brands and influencers for comfort wear, visual tokens (and any textual tokens) are analyzed that have been generated from images relating to brands and influencers (and more particularly, any specific/subset of brands/influencers of interest, such as fashion brands and fashion influencers). The visual tokens (and any textual tokens) may be stored in token database 1940 as described above, and each visual token may be stored in association with an identifier that identifies the visual token as being associated with an image data set. As described in more detail below, the trends engine 1960, in response to receiving a trend query such as from the client device 1970 to analyze trends in comfort wear for these two groups over a defined time period, accesses the token database 1940 to generate brand trend data 2103 and influencer trend data 2105 related to the product type and/or attributes of interest (i.e. object category and/or object attributes) by analyzing visual tokens (and possibly textual tokens) associated with the two image data sets respectively associated with brands and influencers of interest over the time period. The trends engine 1960 is also configured to generate an output based on a comparison of the trend data, such as a yearly change in adoption by brands and influencers, respectively, as for example shown in graph 2106.

As shown in the output 2100, the brand trend data 2103 and influencer trend data 2105 indicates that brands are more interested in comfort wear than influencers, with a higher adoption rating among brands than influencers, neutral popularity among brands compared to declining popularity among influencers, and positive quarterly growth rate (QGR) among brands compared to negative quarterly growth rate among influencers. Thus, an advisory based on this comparison of the trend data may suggest that there is an overinvestment state in comfort wear as brands are increasing their interest in this product type but it is declining among influencers. Brands and/or retailers may therefore consider reducing activation/stock levels.

Further, while the example with respect to FIG. 21 has been described considering comfort wear as an object category for which the trend data is generated, it would be appreciated that a similar analysis of trend data may be performed on object attributes or facets that are determined from images and contained in a visual token, such as a specific apparel color, patterns, textures, shapes, etc. Moreover, trend data may be generated by analyzing textual tokens containing image metadata, which may for example comprise among other things descriptive details such as captions relating to a product or product attribute of interest, and an analysis of trend data may for example consider these textual details encompassed in textual tokens when generating the trend data. Further still, while the foregoing description with respect to the example in FIG. 21 is made with respect to comparing trend data between two different groups, a person skilled in the art will appreciate that multiple groups (i.e. more than two) may be compared.

It would thus be readily apparent that various analysis of trend data can be performed to compare trends between two or more different groups on various facets (e.g. object categories, attributes of objects, etc.) as determined from analyzing visual tokens and/or textual tokens generated from image analysis of images associated with the groups to determine, for example, a rate of adoption for the group on a relative scale of occurrences over a period of time. Example groups that may be of interest to compare include: brands vs. influencers, which may provide an indication of a state of the market; brand A's influencers vs. everyone else, which may provide an indication of a state of brand A; retailer A's influencers vs. retailer B's influencers, which may be used to check on competitors; family-oriented influencers vs. runway models, which may be used to compare influencer groups; one influencer vs. brand A's influencers, which may be used to assess influencer compatibility; one influencer vs. another influencer, which may be used to assess influencers; brand A vs. brand B vs. brand C, which may be used to compare brand products, etc.

Figure 22:
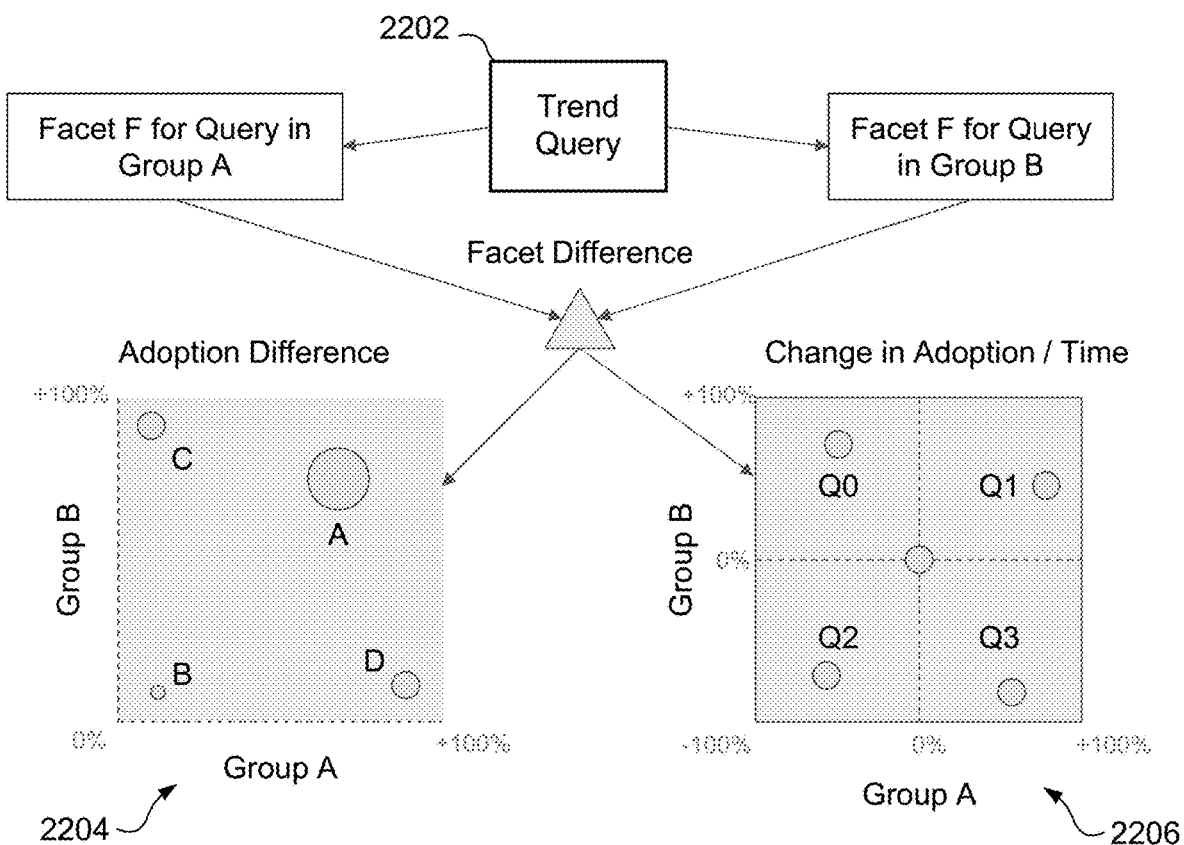
FIG. 22 shows an example of comparing trend data generated from image data sets corresponding to two groups to be compared.

FIG. 22 shows an example of comparing trend data generated from image data sets corresponding to two groups of interest. The comparison of trend data may be used to generate an output, such as output 2100 described with reference to FIG. 21. A trend query 2202 may be received from a client device, such as client device 1970 in FIG. 19. The trend query 2202 may specify a facet of interest, which may for example be a object category and/or an attribute of the object category, a time period of interest, and two or more groups of which to compare trend data with respect to the facet of interest over the time period. As described with reference to FIG. 21, visual tokens (and textual tokens) that have been generated from image data sets corresponding to the groups to be compared can be analyzed to determine occurrences of a facet over time and to generate various types of trend data with respect to the facet of interest. For example, by analyzing the visual tokens for occurrences over time of an object category corresponding to an object defined in the trend query 2022, and/or analyzing the visual tokens for occurrences over time of an object attribute or facet corresponding to an object attribute as defined in the trend query 2022, various trend data can be determined such as adoption, changes in adoption over time, etc. Textual tokens may also be analyzed for image metadata relating to an object category or object attribute corresponding to the product type or the attribute of the product as defined in the trend query 2022.

As would be appreciated by a person skilled in the art, various types of trend data may be generated, and various comparisons of trend data may be performed. In the example shown in FIG. 22, the trend data may comprise information related to the adoption of the facet by Group A and Group B, and a change in the adoption of the facet over time by Group A and Group B. Comparing the trend data gleans meaningful information. For example, with reference to graph 2204 comparing adoption of the facet between Group A and Group B, point A indicates that there is a high adoption among both groups, point B indicates that there is a low adoption among both groups, point C indicates that there is high adoption among Group B only, and point D indicates that there is high adoption among Group A only. The comparison of the trend data can provide direction/advice depending on the end goals of the system user/client device 1970. For example, point D may mean "opportunity for a new product", while point C may mean "reduce stock in a product". Likewise, with reference to graph 2206 comparing adoption of the facet over time between Group A and Group B, Q0 indicates that adoption is increasing among Group B only, Q1 indicates that adoption is increasing among both Group A and Group B, Q2 indicates that adoption is decreasing among both Group A and Group B, and Q3 indicates that adoption is increasing among Group A only. Mutual growth is signalled by Q1 and mutual decline is signalled by Q2, while Q0/Q3 may represent opportunity or over-investment depending on Group A/B selection. An output generated based on the results of the comparison may be tailored to the client who is making the query.

Figure 23A:
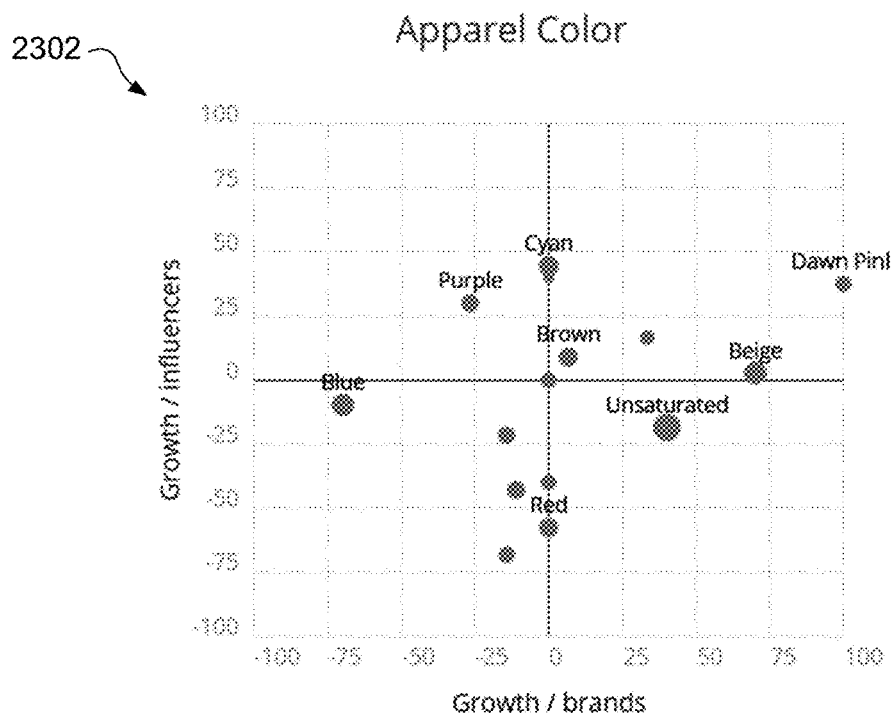
FIGS. 23A and 23B show further examples of comparing trend data generated from image data sets corresponding to two groups to be compared.
Figure 23B:
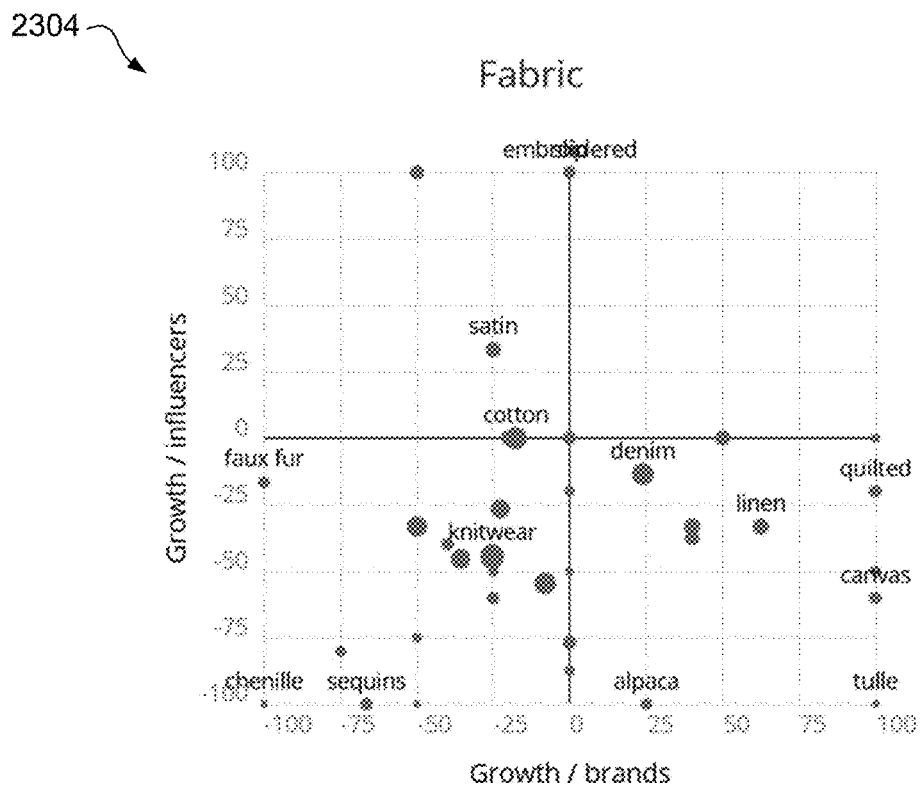

FIGS. 23A and 23B show further examples of comparing trend data generated from image data sets corresponding to two groups of interest. In FIGS. 23A and 23B, trends in growth are compared between two different groups, namely influencers and brands, for a plurality of different attributes of comfort wear. In graph 2302 shown in FIG. 23A, colors of comfort wear apparel are analyzed, and in graph 2304 shown in FIG. 23B, fabrics of comfort wear apparel are analyzed.

The growth trend data for colors of comfort wear apparel represented in the graph 2302 of FIG. 23A can be generated by analyzing visual tokens generated from images associated with relevant brands/influencers to look for visual token information indicating an object category as falling within comfort wear, and an object attribute comprising color information. The growth trend data for fabrics of comfort wear apparel represented in the graph 2304 of FIG. 23B can be generated by analyzing visual tokens generated from images of relevant brands/influencers and looking for visual token information indicating an object category as falling within comfort wear, and an object attribute comprising fabric information. Textual tokens may also be analyzed to generate the trend data. For example, while some fabric types may be readily identified as object attributes during the generation of a visual token, other fabric types may be less visually distinctive but images may reference certain fabric terms, such as in an image caption, which can be encompassed as image metadata in a textual token and analyzed. It would also be appreciated that trend data for certain facets, particularly those which may not be easily identified as an object or object attribute during image analysis, may be generated only from textual tokens comprising image metadata.

Based on a comparison of the growth trend data for colors of comfort wear apparel represented in the graph 2302, purple color may be identified as an opportunity for brands, dawn pink may be identified as mutual growth, gray/unsaturated may be identified as overinvested by brands, and blue may be identified as reduced among both.

Based on a comparison of the growth trend data for fabrics of comfort wear apparel represented in the graph 2304, satin may be identified as an opportunity for brands, nothing is identified as mutual growth, alpaca may be identified as overinvested by brands, and knitwear may be identified as in decline.

Based on the foregoing, it is apparent that various insights can be gleaned by comparing trends in product types and/or attributes between different groups.

Figure 24:
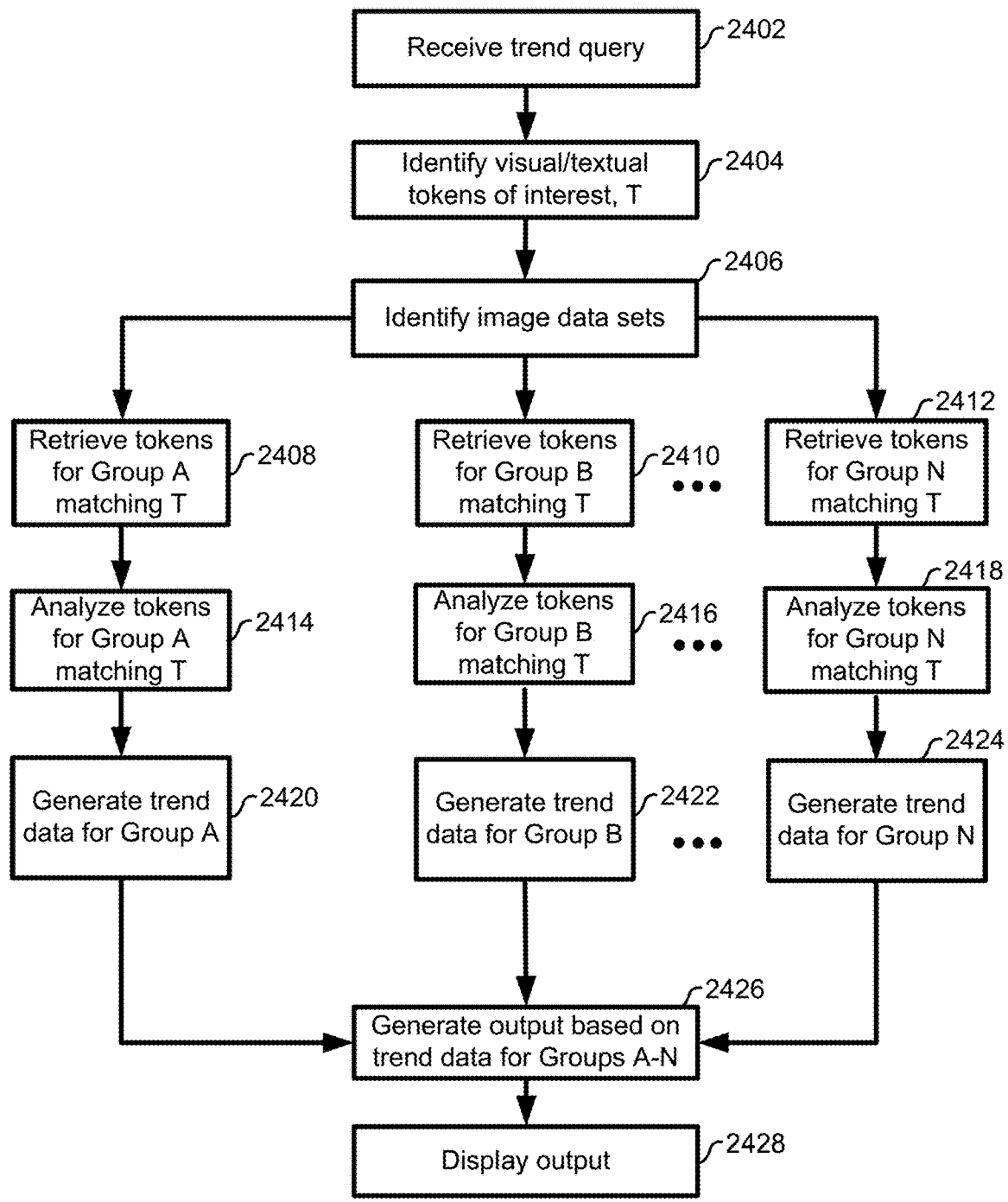
FIG. 24 shows a method for analyzing trends using image data.

FIG. 24 shows a method 2400 for analyzing trends using image data. The method 2400 may be performed by the server/host 1920 of the system for analyzing image data as described with reference to FIG. 19.

As previously described with reference for example to FIGS. 15, 16, and 19, visual tokens (and textual tokens) are generated for a plurality of images and stored in a database, such as token database 1940. Each of the tokens stored in the token database 1940 may be stored in association with an identifier that identifies the token as being associated with an image data set. For example, one image data set may be influencer A's social media photos, another image data set may be retailer B's products, etc. Each image data set may correspond to a group, or a subset of a group, that can be compared for trend analysis. An identifier used to identify the token as being associated with an image data set may for example be a filename or file path, a URL to the source image, a unique identifier representing the first image data set, etc. The server/host 1920 may access the token database 1940 to identify and compare trend data in order to analyze trends, as described above.

In the method 2400, a trend query is received (2402) that relates to an object category and defines two or more groups of interest for which trend data is to be determined with a defined time period. The trend query may comprise a visual token of interest, an image, and/or one or more search terms. One or more visual tokens of interest relating to the object category are identified (2404) for use in searching the token database for trend analysis. For instance, if a search term "scarf" is received, visual tokens of interest may be identified as any visual token comprising data indicating an object category of "scarf". Likewise, if a trend query comprises an image of a scarf, visual tokens of interest may be identified as any visual token comprising data indicating an object category of "scarf". If the trend query comprises the visual token of interest, the visual token in the trend query may be identified as the visual token of interest. The trend query may further define an object attribute of interest, such as an object attribute "tie-dye" within object category "scarf". The visual token of interest may be identified as relating to both the object category and object attribute. Note that textual tokens of interest may also be identified relating to the object category and/or object attribute in the trend query, such as textual tokens comprising image metadata relevant to the object category "scarf".

One or more image data sets are identified that are associated with each of the two or more groups of interest (2406). Each group may be associated with one or more image data sets. For example, a group may be a particular influencer, in which case there may be a single image data set associated with that particular influencer. In another example, a group may be a group of influencers, and the image data sets associated with each of the influencers would be identified as being associated with the group of interest. The trend query may explicitly identify the two or more groups for which to perform a trend analysis, or alternatively, the trend query may define grouping parameters to identify the groups of interest and the corresponding image data sets. For example, a client may wish to compare trend data between influencers born in the 1990s (Group A) and influencers born in the 2000s (Group B). Additionally or alternatively, a client may wish to compare trend data between North American influencers (Group A) and European influencers (Group B). The client may also only be interested in influencers with a social media following of more than one million followers. The grouping parameters may thus for example define an influencer age group, an influencer geographic region, an influencer social media following, etc. and the method may further comprise determining the groups of interest (and identifying the associated image data sets of interest) from the grouping parameters, which may include analyzing textual tokens associated with images to identify image data sets and groups of interest.

Visual tokens in the identified image data sets matching the visual tokens of interest are retrieved (2408, 2410, 2412). The visual tokens may be retrieved from the token database, or in some instances, such as if relevant images have not yet been processed, images from the identified image data sets within the defined time period may be retrieved, and one or more visual tokens may be generated for each of these images. The visual tokens generated from the images that match the visual tokens of interest may thus be retrieved, and the visual tokens generated from the images may be stored in the token database.

The visual tokens in the identified image data sets matching the visual tokens of interest are analyzed (2414, 2416, 2418), and trend data is generated for each of the groups of interest for the defined period of time (2420, 2422, 2424). The trend data may be generated by analyzing the visual tokens to determine the presence of an object attribute in relation to the object category over time. For example, an object category may be scarves, and the trend data may indicate trends in colors of scarves over time. The trend query may specify an object attribute of interest, (e.g. colors, "tie-dye" colors, etc.), or the trend analysis may generate trends for various attributes relating to scarves (e.g. colors, materials, shapes, patterns, etc.). Further, if textual tokens of interest have been identified, the generation of the trend data may be further based on textual tokens in the identified image data sets matching the textual tokens of interest. An output is generated based on a comparison of the trend data for the groups of interest (2426). Such output may comprise a comparison between groups as has been described with reference to FIGS. 21 to 23, for example. The output may be displayed (2428), such as on a display within the system and/or within a UI on a client device interacting with the system, and/or sent to an external device for display.

As previously described, various types of trend data can be generated, and various types of outputs can be generated relevant to client who has made the query and the groups of interest/image data sets that are being compared. In some examples, an image data set corresponding to a group of interest comprises images of influencers. In some examples, an image data set corresponding to a group of interest comprises product images related to brands. In some examples, a first image data set corresponding to a first group of interest comprises images of a first group of influencers, and a second image data set corresponding to a second group of interest comprises images of a second group of influencers. In some examples, a first image data set corresponding to a first group of interest comprises product images from a first brand, and a second image data set corresponding to a second group of interest comprises product images from a second brand. A person skilled in the art will appreciate that various types of analysis and outputs can be generated that are relevant to the trend query for analyzing trend data.

Figure 25:
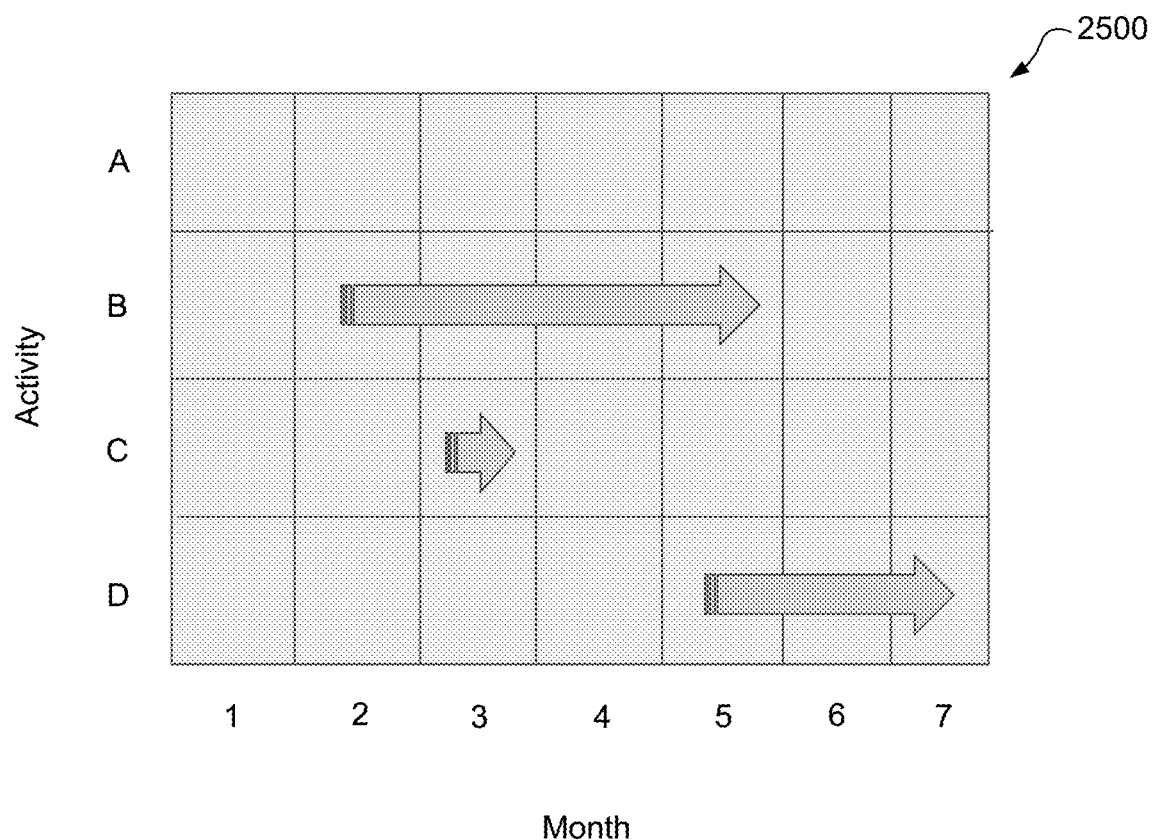
FIG. 25 shows an example representation of an activation generated from the trend data.

A further aspect of an output that may be generated is an activation for the trend. FIG. 25 shows an example representation of an activation generated from the trend data. An activation comprises one or more scheduled activities relating to the trend data, which may be generated from the trend data and presented for display. The activation may be generated based on an identified trend, as for example described with reference to FIG. 15, FIG. 20, etc., for example by determining one or more scheduled activities upon identification of a trend, and/or the activation may be generated based on an analysis/comparison of trends, as for example described with reference to FIGS. 21 to 24, for example by identifying a trend based on a comparison of two groups, and/or identifying a market opportunity in a particular trend and determining one or more scheduled activities to take advantage of the market opportunity for the trend. The activation may be suggested to a client based on the trend data. For example, an analysis of trend data may indicate: "Your audience is 13% more interested in The Oscars™ than last year", and the system may recommend specific or general tasks related to sales and/or marketing and/or other activities tied to The Oscars™ that should be done. As another example, an analysis of trend data may indicate: "Cashmere is up 37% in July 2020 within a Retailer's group of influencers, so recommendation(s) are made in terms of additional Cashmere-based products for that Retailer product line in Fall/Winter 2020", and the system may recommend activating one or more trends involving Cashmere, including tasks such as product design activities, scheduling product purchasing activities, eCommerce activities, marketing activities and/or any number of other tasks.

The activation may be generated according to the client for which a trend identification/analysis is being performed. For example, an influencer-oriented activation may define scheduled activities in response to an influencer loving a trend, such activities including: pick clothes out of closet matching trend, put clothes on, take photo, post to Instagram. A more complex activation may also be generated. For example, for a retailer/brand a trend activation may comprise scheduled activities including: (i) trend is activated; (ii) order N units of Product X matching trend; (iii) schedule photoshoot(s) for product, including models, photographer, etc.; (iv) post photos/videos to social media channels; (v) buy ads; etc.

In FIG. 25, the activation is represented on a graph 2500 depicting activities to be performed based on the trend data and the timing for performing said activities. An activation may be particularly useful for generating marketing calendars, for example. In one example, a marketing calendar can advise of the seasonality of different colors, etc., and can be used by teams to coordinate marketing campaigns and activities. While the graph 2500 in FIG. 25 is simplified for the sake of explanation, a person skilled in the art will appreciate that an activation may be generated that comprises more specific details, including more activities, more specific timelines for initiating/completing the activity, etc., and may for example define specific days, hours, etc. that activities are to be initiated/completed and may define activities over longer periods of times (e.g. several years).

In some implementations, the generation of the activation may be automatically performed based on the trend data and/or a comparison of the trend data. The client device may for example be presented with an option of whether to activate and/or display the activation, such as by adding the activation to a calendar or reminder list on their client device and/or displaying the activation graphically in a UI presented on the client device. The system of FIG. 19, for example, may support a software application running on the client device, and the activation may be displayed within the application, such as on a landing page upon opening the application. Additional data relevant to the activation, such as various metrics, top photos, influencers, etc., may also be displayed.

Numerous other embodiments may be envisaged without departing from the scope of the disclosure. Application code may be embodied in any form of computer program product. A computer program product comprises a medium configured to store or transport computer readable code, or in which computer readable code may be embedded. Some examples of computer program products are non-volatile memories, CD-ROM, DVD-ROM, ROM cards, magnetic tapes, computer hard drives, solid state disks, servers on a network, and carrier waves.

The computer systems described above are for purposes of example only. An embodiment may be implemented in any type of computer system or programming or processing environment. It will be apparent to persons skilled in the art that a number of variations and modifications can be made without departing from the scope of the disclosure as defined in the claims.

The method steps may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The embodiments described above are intended to be illustrative only. The scope of the disclosure is therefore intended to be limited solely by the scope of the appended claims.

What is claimed is:

1. A method for analyzing trends using image data, comprising:
   generating visual tokens associated with images from a plurality of image data sets, wherein generating the visual tokens comprises, for each image in the plurality of image data sets:
      detecting an object in the image by performing foreground detection on the image to determine contours of the object;
      determining feature descriptors of the image;
      classifying the object in accordance with an object category;
      determining one or more attributes of the object, based on the feature descriptors within the contours of the object; and
      generating a visual token associated with the image, the visual token comprising information including the object category and the one or more attributes of the object determined from the feature descriptors;
   storing the visual tokens in a token database, wherein each visual token stored in the database is stored in association with an identifier that identifies the visual token as being associated with an image data set;
      receiving a trend query relating to an object category and defining two or more groups of interest for which trend data is to be determined with a defined time period;
      identifying visual tokens of interest relating to the object category for use in searching the token database storing the plurality of visual tokens;
      identifying one or more image data sets associated with each of the two or more groups of interest;
      analyzing visual tokens matching the visual tokens of interest that are associated with the identified image data sets to generate trend data for each of the two or more groups of interest for the defined period of time; and
   generating an output based on a comparison of the trend data generated for the two or more groups of interest for the defined period of time.

2. The method of claim 1, wherein the trend query comprises the visual tokens of interest, or at least one of an image and one or more search terms from which the visual tokens of interest can be derived.

3. The method of claim 1, further comprising retrieving images from the one or more image data sets within the defined time period, and generating one or more visual tokens for each of the images.

4. The method of claim 1, wherein the trend data generated by analyzing the visual tokens is indicative of a presence of an object attribute in relation to the object category over time.

5. The method of claim 4, wherein the trend query further defines the object attribute for which trend data is to be determined, and wherein the visual tokens of interest relate to the object attribute.

6. The method of claim 1, wherein each of the two or more groups of interest comprise one of: an influencer, a group of influencers, a retailer, a group of retailers, a brand, and a group of brands.

7. The method of claim 1, wherein the plurality of image data sets are retrieved from one or more of: the Internet, social media sites, television content, and product databases.

8. The method of claim 1, wherein classifying the object comprises:
   computing, with a simple cells layer, convolution operations using filters selected from a group consisting of: 2D Gabor, or Gabor-like filters, over a range of parameters;
   performing, with a complex cells layer, a pooling operation over a retinotopically local cluster of simple cells within a complex receptive field;
   sending an output of the pooling operation to one of a group consisting of: the simple cells layer, another complex cells layer, or a feature descriptor layer;
   terminating computations in the simple cells layer and complex cells layer as per a Cellular Neural Network definition, wherein the output is a set of values representing a set of feature descriptors;
   assessing, with a complex localization cells layer, regions in which the object of the product image is located; and
   classifying the object using the complex localization cells layer, regions and feature descriptors.

9. The method of claim 1, wherein the token database further stores a plurality of textual tokens, wherein each textual token stored in the token database is stored in association with an identifier that identifies the textual token as being associated with an image data set.

10. The method of claim 9, further comprising populating the database with the plurality of textual tokens, wherein the plurality of textual tokens are generated from a plurality of images, and for a respective image a textual token is generated by:
    determining image metadata for the image; and
    generating the textual token associated with the image, the textual token comprising the image metadata.

11. The method of claim 10, wherein the image metadata comprises one or more of:
    a timestamp of the image, descriptive details associated with the image, a popularity of the image, and a location of the image, and wherein the descriptive details comprise one or more of: a social network, a user name, a caption, a URL associated with the image, pixel co-ordinates associated with products or brands present in the image, and details about a subject in the image.

12. The method of claim 11, wherein the trend query defines grouping parameters specifying the two or more groups of interest, and wherein identifying the one or more image data sets associated with each of the two or more groups of interest is performed by analyzing the image metadata of the textual tokens based on the grouping parameters.

13. The method of claim 11, further comprising identifying textual tokens of interest relating to the object category in the trend query, and wherein generating the trend data for each of the two or more groups of interest is further based on an analysis of textual tokens matching the textual tokens of interest that are associated with each of the identified image data sets.

14. The method of claim 1, further comprising displaying the output on a display.

15. The method of claim 1, further comprising generating an activation for the trend, the activation comprising one or more scheduled activities relating to the trend data.

16. A system for analyzing trends using image data, comprising:
a token database storing a plurality of visual tokens, wherein each visual token stored in the token database is stored in association with an identifier that identifies the visual token as being associated with an image data set; and
a server comprising at least one processor configured to:
generate the plurality of visual tokens for images from a plurality of image data sets,
wherein generating the plurality of visual tokens comprises, for each image in the plurality of image data sets:
detecting an object in the image by performing foreground detection on the image to determine contours of the object;
determining feature descriptors of the image;
classifying the object in accordance with an object category;
determining one or more attributes of the object, based on the feature descriptors within the contours of the object; and
generating a visual token associated with the image, the visual token comprising information including the object category and the one or more attributes of the object determined from the feature descriptors;
store the visual tokens in the token database;
receive a trend query relating to an object category and defining two or more groups of interest for which trend data is to be determined with a defined time period;
identify visual tokens of interest relating to the object category for use in searching the token database;
identify one or more image data sets associated with each of the two or more groups of interest;
analyze visual tokens matching the visual tokens of interest that are associated with the identified image data sets to generate trend data for each of the two or more groups of interest for the defined period of time; and
generate an output based on a comparison of the trend data generated for the two or more groups of interest for the defined period of time.

17. The system of claim 16, wherein the trend data generated by analyzing the visual tokens is indicative of a presence of an object attribute in relation to the object category over time.

18. The system of claim 16, wherein the at least one processor is configured to display the output on a display.

19. The system of claim 16, wherein the at least one processor is configured to generate an activation for the trend, the activation comprising one or more scheduled activities relating to the trend data.

* * * * *